US012478248B2

(12) United States Patent
Faria Ribeiro et al.

(10) Patent No.: US 12,478,248 B2
(45) Date of Patent: Nov. 25, 2025

(54) RING HALOMETER SYSTEM AND METHOD FOR QUANTIFYING DYSPHOTOPSIAS

(71) Applicant: AMO Groningen B.V., Groningen (NL)

(72) Inventors: Miguel Faria Ribeiro, Braga (PT); Mark Jenkins Sanchez, Groningen (NL); Aixa Alarcon Heredia, Haren (NL); Robert Rosen, Groningen (NL)

(73) Assignee: AMO Groningen B.V., Groningen (NL)

(*) Notice: Subject to any disclaimer, the term of this patent is extended or adjusted under 35 U.S.C. 154(b) by 734 days.

(21) Appl. No.: 17/661,902

(22) Filed: May 3, 2022

(65) Prior Publication Data

US 2022/0354362 A1 Nov. 10, 2022

Related U.S. Application Data

(60) Provisional application No. 63/184,709, filed on May 5, 2021.

(51) Int. Cl.
*A61B 3/00* (2006.01)
*A61F 2/16* (2006.01)
*H05B 45/12* (2020.01)

(52) U.S. Cl.
CPC .............. *A61B 3/0008* (2013.01); *A61F 2/16* (2013.01); *H05B 45/12* (2020.01)

(58) Field of Classification Search
CPC ....... A61B 3/0008; A61B 3/063; A61B 3/024; A61F 2/16; H05B 45/12

(Continued)

(56) References Cited

U.S. PATENT DOCUMENTS 2,077,092 A 4/1937 Broder
3,305,294 A 2/1967 Alvarez
(Continued)

FOREIGN PATENT DOCUMENTS

DE 8107675 U1 7/1981
DE 102005022683 A1 11/2006
(Continued)

OTHER PUBLICATIONS

Campbell, F.W et al., "Optical and Retinal Factors Affecting Visual Resolution," The Journal of Physiology, vol. 181 (3), pp. 576-593, 1965.
(Continued)

*Primary Examiner* — Mohammed A Hasan

(57) ABSTRACT

A ring halometer system configured to quantify dysphotopsias in a patient. The system includes a white screen and a first light source configured to emit a glare source from the white screen. The glare source is configured to form a veil of light visible to the patient when the glare source interacts with an optical surface of the eye of the patient. The system also includes a second light source configured to project a light ring with varying luminance concentric with the glare light source on the white screen, and a controller coupled to the second light source configured to adjust a size of the light ring. The system may also include an electronic device configured to determine a level of bothersomeness of the dysphotopsias experienced by the patient based on the size of the light ring.

30 Claims, 7 Drawing Sheets

(58) Field of Classification Search
USPC ........................................................ 351/224
See application file for complete search history.

(56) References Cited

U.S. PATENT DOCUMENTS

| | | |
|---|---|---|
| 3,367,734 A | 2/1968 | Karl et al. |
| 3,735,685 A | 5/1973 | Plummer |
| 4,010,496 A | 3/1977 | Neefe |
| 4,056,311 A | 11/1977 | Winthrop |
| 4,077,071 A | 3/1978 | Freeman |
| 4,093,361 A | 6/1978 | Erickson et al. |
| 4,134,160 A | 1/1979 | Bayers |
| 4,162,122 A | 7/1979 | Cohen |
| 4,174,543 A | 11/1979 | Kelman |
| 4,210,391 A | 7/1980 | Cohen et al. |
| 4,249,272 A | 2/1981 | Poler |
| 4,254,509 A | 3/1981 | Tennant |
| 4,254,510 A | 3/1981 | Tennant |
| 4,316,293 A | 2/1982 | Bayers |
| 4,319,564 A | 3/1982 | Karickhoff |
| 4,338,005 A | 7/1982 | Cohen |
| 4,340,283 A | 7/1982 | Cohen |
| 4,370,760 A | 2/1983 | Kelman |
| 4,377,873 A | 3/1983 | Reichert, Jr. |
| 4,402,579 A | 9/1983 | Poler |
| 4,403,353 A | 9/1983 | Tennant |
| 4,404,694 A | 9/1983 | Kelman |
| 4,409,691 A | 10/1983 | Levy |
| 4,424,597 A | 1/1984 | Schlegel |
| 4,437,733 A | 3/1984 | Takahashi et al. |
| 4,446,581 A | 5/1984 | Blake |
| 4,480,340 A | 11/1984 | Shepard |
| 4,500,382 A | 2/1985 | Foster |
| 4,504,982 A | 3/1985 | Burk |
| 4,551,864 A | 11/1985 | Akhavi |
| 4,556,998 A | 12/1985 | Siepser |
| 4,560,383 A | 12/1985 | Leiske |
| 4,605,409 A | 8/1986 | Kelman |
| 4,605,411 A | 8/1986 | Fedorov et al. |
| 4,629,460 A | 12/1986 | Dyer |
| 4,629,462 A | 12/1986 | Feaster |
| 4,637,697 A | 1/1987 | Freeman |
| 4,642,112 A | 2/1987 | Freeman |
| 4,655,565 A | 4/1987 | Freeman |
| 4,665,913 A | 5/1987 | L'Esperance, Jr. |
| 4,669,466 A | 6/1987 | L'Esperance |
| 4,673,406 A | 6/1987 | Schlegel |
| 4,676,791 A | 6/1987 | LeMaster et al. |
| 4,676,792 A | 6/1987 | Praeger |
| 4,681,102 A | 7/1987 | Bartell |
| 4,687,484 A | 8/1987 | Kaplan |
| 4,687,485 A | 8/1987 | Lim et al. |
| RE32,525 E | 10/1987 | Pannu |
| 4,725,277 A | 2/1988 | Bissonette |
| 4,732,148 A | 3/1988 | L'Esperance, Jr. |
| 4,734,095 A | 3/1988 | Siepser |
| 4,764,930 A | 8/1988 | Bille et al. |
| 4,770,172 A | 9/1988 | L'Esperance, Jr. |
| 4,773,414 A | 9/1988 | L'Esperance, Jr. |
| 4,778,462 A | 10/1988 | Grendahl |
| 4,781,717 A | 11/1988 | Grendahl |
| 4,787,903 A | 11/1988 | Grendahl |
| 4,787,904 A | 11/1988 | Severin et al. |
| 4,795,462 A | 1/1989 | Grendahl |
| 4,798,608 A | 1/1989 | Grendahl |
| 4,798,609 A | 1/1989 | Grendahl |
| 4,828,558 A | 5/1989 | Kelman |
| 4,834,748 A | 5/1989 | McDonald |
| 4,863,261 A | 9/1989 | Flammer |
| 4,863,539 A | 9/1989 | Lee et al. |
| 4,898,461 A | 2/1990 | Portney |
| 4,932,970 A | 6/1990 | Portney |
| 4,995,714 A | 2/1991 | Cohen |
| 4,995,715 A | 2/1991 | Cohen |
| 4,997,442 A | 3/1991 | Barrett |
| 5,016,977 A | 5/1991 | Baude et al. |
| 5,019,097 A | 5/1991 | Knight et al. |
| 5,042,938 A | 8/1991 | Shimozono |
| 5,047,052 A | 9/1991 | Dubroff |
| 5,054,905 A | 10/1991 | Cohen |
| 5,056,908 A | 10/1991 | Cohen |
| 5,066,301 A | 11/1991 | Wiley |
| 5,071,432 A | 12/1991 | Baikoff |
| 5,078,742 A | 1/1992 | Dahan |
| 5,089,023 A | 2/1992 | Swanson |
| 5,096,285 A | 3/1992 | Silberman |
| 5,108,388 A | 4/1992 | Trokel et al. |
| 5,114,220 A | 5/1992 | Baude et al. |
| 5,117,306 A | 5/1992 | Cohen |
| 5,120,120 A | 6/1992 | Cohen |
| 5,121,979 A | 6/1992 | Cohen |
| 5,121,980 A | 6/1992 | Cohen |
| 5,133,749 A | 7/1992 | Nordan |
| 5,144,483 A | 9/1992 | Cohen |
| 5,147,395 A | 9/1992 | Willis |
| 5,147,397 A | 9/1992 | Christ et al. |
| 5,163,934 A | 11/1992 | Munnerlyn |
| 5,173,723 A | 12/1992 | Volk et al. |
| 5,184,405 A | 2/1993 | Cress |
| 5,191,187 A | 3/1993 | Kajikawa |
| 5,197,981 A | 3/1993 | Southard |
| 5,201,763 A | 4/1993 | Brady et al. |
| 5,203,790 A | 4/1993 | McDonald |
| 5,207,668 A | 5/1993 | L'Esperance, Jr. |
| 5,217,491 A | 6/1993 | Vanderbilt |
| 5,219,343 A | 6/1993 | L'Esperance, Jr. |
| 5,225,858 A | 7/1993 | Portney |
| 5,229,797 A | 7/1993 | Futhey et al. |
| 5,258,025 A | 11/1993 | Fedorov et al. |
| 5,278,592 A | 1/1994 | Marie et al. |
| 5,379,110 A | 1/1995 | Matsui et al. |
| 5,408,281 A | 4/1995 | Zhang |
| 5,433,745 A | 7/1995 | Graham et al. |
| 5,476,513 A | 12/1995 | Brady et al. |
| 5,479,220 A | 12/1995 | Komatsu et al. |
| 5,567,365 A | 10/1996 | Weinschenk, III et al. |
| 5,571,177 A | 11/1996 | Deacon et al. |
| 5,620,720 A | 4/1997 | Glick et al. |
| 5,628,796 A | 5/1997 | Suzuki |
| 5,646,791 A | 7/1997 | Glockler |
| 5,652,638 A | 7/1997 | Roffman et al. |
| 5,652,640 A | 7/1997 | Schneider et al. |
| 5,691,800 A | 11/1997 | Iki et al. |
| 5,699,142 A | 12/1997 | Lee et al. |
| 5,716,403 A | 2/1998 | Tran et al. |
| 5,748,282 A | 5/1998 | Freeman |
| 5,760,871 A | 6/1998 | Kosoburd et al. |
| 5,796,462 A | 8/1998 | Roffman et al. |
| 5,801,807 A | 9/1998 | Satake et al. |
| 5,928,282 A | 7/1999 | Nigam |
| 5,968,094 A | 10/1999 | Werblin et al. |
| 5,993,438 A | 11/1999 | Juhasz et al. |
| 6,015,435 A | 1/2000 | Valunin et al. |
| 6,051,024 A | 4/2000 | Cumming |
| 6,095,651 A | 8/2000 | Williams et al. |
| 6,126,283 A | 10/2000 | Wen et al. |
| 6,126,286 A | 10/2000 | Portney |
| 6,129,759 A | 10/2000 | Chambers |
| 6,142,625 A | 11/2000 | Sawano et al. |
| 6,179,870 B1 | 1/2001 | Sourdille et al. |
| 6,210,005 B1 | 4/2001 | Portney |
| 6,235,055 B1 | 5/2001 | Chu |
| 6,241,356 B1 | 6/2001 | Von et al. |
| 6,261,321 B1 | 7/2001 | Kellan |
| 6,319,282 B1 | 11/2001 | Nishi |
| 6,338,559 B1 | 1/2002 | Williams et al. |
| 6,419,697 B1 | 7/2002 | Kelman |
| 6,457,826 B1 | 10/2002 | Lett |
| 6,460,997 B1 | 10/2002 | Frey et al. |
| 6,464,355 B1 | 10/2002 | Gil |
| 6,474,814 B1 | 11/2002 | Griffin |
| 6,488,708 B2 | 12/2002 | Sarfarazi |
| 6,491,721 B2 | 12/2002 | Freeman et al. |
| 6,497,483 B2 | 12/2002 | Frey et al. |

(56) References Cited

U.S. PATENT DOCUMENTS

| | | |
|---|---|---|
| 6,527,389 B2 | 3/2003 | Portney |
| 6,533,416 B1 | 3/2003 | Fermigier et al. |
| 6,536,899 B1 | 3/2003 | Fiala |
| 6,537,317 B1 | 3/2003 | Steinert et al. |
| 6,547,822 B1 | 4/2003 | Lang |
| 6,550,917 B1 | 4/2003 | Neal et al. |
| 6,554,859 B1 | 4/2003 | Lang et al. |
| 6,557,992 B1 | 5/2003 | Dwyer et al. |
| 6,575,572 B2 | 6/2003 | Lai et al. |
| 6,598,606 B2 | 7/2003 | Terwee et al. |
| 6,609,793 B2 | 8/2003 | Norrby et al. |
| 6,705,729 B2 | 3/2004 | Piers et al. |
| 6,786,603 B2 | 9/2004 | Altmann |
| 6,802,605 B2 | 10/2004 | Cox et al. |
| 6,808,262 B2 | 10/2004 | Chapoy et al. |
| 6,817,714 B2 | 11/2004 | Altmann |
| 6,830,332 B2 | 12/2004 | Piers et al. |
| 6,846,326 B2 | 1/2005 | Zadno-Azizi et al. |
| 6,851,803 B2 | 2/2005 | Wooley et al. |
| 6,899,425 B2 | 5/2005 | Roffman et al. |
| 6,923,539 B2 | 8/2005 | Simpson et al. |
| 6,923,540 B2 | 8/2005 | Ye et al. |
| 6,986,578 B2 | 1/2006 | Jones |
| 7,036,931 B2 | 5/2006 | Lindacher et al. |
| 7,048,760 B2 | 5/2006 | Cumming |
| 7,061,693 B2 | 6/2006 | Zalevsky |
| 7,073,906 B1 | 7/2006 | Portney |
| 7,137,702 B2 | 11/2006 | Piers et al. |
| 7,156,516 B2 | 1/2007 | Morris et al. |
| 7,188,949 B2 | 3/2007 | Bandhauer et al. |
| 7,281,797 B2 | 10/2007 | Yamaguchi et al. |
| 7,287,852 B2 | 10/2007 | Fiala |
| 7,293,873 B2 | 11/2007 | Dai et al. |
| 7,296,893 B2 | 11/2007 | Dai |
| 7,339,539 B2 | 3/2008 | Joannopoulos et al. |
| 7,350,916 B2 | 4/2008 | Hong et al. |
| 7,365,917 B2 | 4/2008 | Zalevsky |
| 7,377,640 B2 | 5/2008 | Piers et al. |
| 7,425,068 B2 | 9/2008 | Koest |
| 7,441,894 B2 | 10/2008 | Zhang et al. |
| 7,455,404 B2 | 11/2008 | Bandhauer et al. |
| 7,455,407 B2 | 11/2008 | Neal et al. |
| 7,475,986 B2 | 1/2009 | Dai et al. |
| 7,547,102 B2 | 6/2009 | Dai |
| 7,615,073 B2 | 11/2009 | Deacon et al. |
| 7,616,330 B2 | 11/2009 | Neal et al. |
| 7,659,971 B2 | 2/2010 | Warden et al. |
| 7,726,813 B2 | 6/2010 | Dai |
| 7,784,946 B2 | 8/2010 | Leblanc |
| 7,794,497 B2 | 9/2010 | Brady et al. |
| 7,857,451 B2 | 12/2010 | Thibos et al. |
| 7,871,162 B2 | 1/2011 | Weeber |
| 7,911,211 B2 | 3/2011 | Crain et al. |
| 7,931,371 B2 | 4/2011 | Dai |
| 7,931,374 B2 | 4/2011 | Dai et al. |
| 7,938,538 B2 | 5/2011 | Lu et al. |
| 7,944,553 B1 | 5/2011 | Simpson et al. |
| 7,969,585 B2 | 6/2011 | Neal et al. |
| 8,123,357 B2 | 2/2012 | Dai et al. |
| 8,382,281 B2 | 2/2013 | Weeber |
| 8,480,228 B2 | 7/2013 | Weeber |
| 8,596,787 B2 | 12/2013 | Dai |
| 8,657,445 B2 | 2/2014 | Olsen |
| 8,696,119 B2 | 4/2014 | Van et al. |
| 8,740,382 B1 | 6/2014 | Liu et al. |
| 8,746,882 B2 | 6/2014 | Vidal et al. |
| 8,764,822 B2 | 7/2014 | Harris et al. |
| 8,862,447 B2 | 10/2014 | Weeber |
| 9,211,061 B2 | 12/2015 | Kasthurirangan et al. |
| 9,241,627 B2 | 1/2016 | Steinmueller |
| 9,301,676 B2 | 4/2016 | Zhao et al. |
| 9,393,108 B2 | 7/2016 | Canovas et al. |
| 9,491,431 B2 | 11/2016 | Zhou |
| 9,554,696 B2 | 1/2017 | Zhao et al. |
| 9,700,201 B2 | 7/2017 | Bex et al. |
| 9,823,163 B2 | 11/2017 | Alarcon et al. |
| 10,123,690 B2 | 11/2018 | Zhao et al. |
| 10,739,227 B2 | 8/2020 | Zhao et al. |
| 11,013,594 B2 | 5/2021 | Rosen et al. |
| 11,282,605 B2 | 3/2022 | Rosen |
| 11,385,126 B2 | 7/2022 | Zhao |
| 2001/0051825 A1 | 12/2001 | Peterson |
| 2002/0071097 A1 | 6/2002 | Ross et al. |
| 2002/0118337 A1 | 8/2002 | Perrott et al. |
| 2002/0173846 A1 | 11/2002 | Blake et al. |
| 2002/0196408 A1 | 12/2002 | Bhalakia et al. |
| 2002/0196412 A1 | 12/2002 | Abitbol |
| 2003/0033013 A1 | 2/2003 | Callahan et al. |
| 2003/0053025 A1 | 3/2003 | Turner et al. |
| 2003/0076478 A1 | 4/2003 | Cox |
| 2003/0163122 A1 | 8/2003 | Sumiya |
| 2003/0171808 A1 | 9/2003 | Phillips |
| 2003/0189690 A1 | 10/2003 | Mihashi et al. |
| 2004/0021824 A1 | 2/2004 | Ye et al. |
| 2004/0021825 A1 | 2/2004 | Richardson |
| 2004/0054358 A1 | 3/2004 | Cox et al. |
| 2004/0057010 A1 | 3/2004 | Altmann |
| 2004/0068317 A1 | 4/2004 | Knight |
| 2004/0085515 A1 | 5/2004 | Roffman et al. |
| 2004/0106992 A1 | 6/2004 | Lang et al. |
| 2004/0111153 A1 | 6/2004 | Woods et al. |
| 2004/0150789 A1 | 8/2004 | Jones |
| 2004/0156014 A1 | 8/2004 | Piers et al. |
| 2004/0167622 A1 | 8/2004 | Sunalp et al. |
| 2004/0183997 A1 | 9/2004 | Suzuki |
| 2004/0230299 A1 | 11/2004 | Simpson et al. |
| 2004/0260275 A1 | 12/2004 | Liang et al. |
| 2005/0024647 A1 | 2/2005 | Montgomery |
| 2005/0088615 A1 | 4/2005 | Roffman et al. |
| 2005/0096226 A1 | 5/2005 | Stock et al. |
| 2005/0122474 A1 | 6/2005 | Koretz |
| 2005/0125056 A1 | 6/2005 | Deacon et al. |
| 2005/0128432 A1 | 6/2005 | Altmann |
| 2005/0195364 A1 | 9/2005 | Dai |
| 2005/0203619 A1 | 9/2005 | Altmann |
| 2005/0251254 A1 | 11/2005 | Brady et al. |
| 2005/0267575 A1 | 12/2005 | Nguyen et al. |
| 2006/0009816 A1 | 1/2006 | Fang et al. |
| 2006/0030938 A1 | 2/2006 | Altmann |
| 2006/0034003 A1 | 2/2006 | Zalevsky |
| 2006/0055877 A1 | 3/2006 | Yanari |
| 2006/0055883 A1 | 3/2006 | Morris et al. |
| 2006/0066808 A1 | 3/2006 | Blum et al. |
| 2006/0068453 A1 | 3/2006 | Altieri |
| 2006/0098162 A1 | 5/2006 | Bandhauer et al. |
| 2006/0098163 A1 | 5/2006 | Bandhauer et al. |
| 2006/0109421 A1 | 5/2006 | Ye et al. |
| 2006/0116763 A1 | 6/2006 | Simpson |
| 2006/0116764 A1 | 6/2006 | Simpson |
| 2006/0116765 A1 | 6/2006 | Blake et al. |
| 2006/0176572 A1 | 8/2006 | Fiala |
| 2006/0203198 A1 | 9/2006 | Liang |
| 2006/0238702 A1 | 10/2006 | Glick et al. |
| 2006/0244904 A1 | 11/2006 | Hong et al. |
| 2006/0244906 A1 | 11/2006 | Piers et al. |
| 2006/0244916 A1 | 11/2006 | Guillon |
| 2006/0274268 A1 | 12/2006 | Andino et al. |
| 2006/0279699 A1 | 12/2006 | Liang |
| 2006/0279700 A1 | 12/2006 | Liang |
| 2007/0052920 A1 | 3/2007 | Stewart et al. |
| 2007/0052927 A1 | 3/2007 | Noda et al. |
| 2007/0115432 A1 | 5/2007 | Thibos |
| 2007/0129803 A1 | 6/2007 | Cumming et al. |
| 2007/0171362 A1 | 7/2007 | Simpson et al. |
| 2007/0182924 A1 | 8/2007 | Hong et al. |
| 2007/0195265 A1 | 8/2007 | Dreher et al. |
| 2007/0211214 A1 | 9/2007 | Dai |
| 2007/0268453 A1 | 11/2007 | Hong et al. |
| 2007/0285617 A1 | 12/2007 | Mills et al. |
| 2008/0018910 A1 | 1/2008 | Neal et al. |
| 2008/0030677 A1 | 2/2008 | Simpson |
| 2008/0033546 A1 | 2/2008 | Liang |
| 2008/0079895 A1 | 4/2008 | Jubin et al. |
| 2008/0161913 A1 | 7/2008 | Brady et al. |

(56) References Cited

U.S. PATENT DOCUMENTS

| | | |
|---|---|---|
| 2008/0161914 A1 | 7/2008 | Brady et al. |
| 2008/0198331 A1 | 8/2008 | Azar et al. |
| 2008/0231809 A1 | 9/2008 | Haigis |
| 2008/0269642 A1 | 10/2008 | Deacon et al. |
| 2008/0273169 A1 | 11/2008 | Blum et al. |
| 2008/0291393 A1 | 11/2008 | Menezes |
| 2009/0000628 A1 | 1/2009 | Somani et al. |
| 2009/0012609 A1 | 1/2009 | Geraghty et al. |
| 2009/0036980 A1 | 2/2009 | Norrby et al. |
| 2009/0062911 A1 | 3/2009 | Bogaert |
| 2009/0067940 A1 | 3/2009 | Arai et al. |
| 2009/0164008 A1 | 6/2009 | Hong et al. |
| 2009/0168019 A1 | 7/2009 | Tuan |
| 2009/0187242 A1 | 7/2009 | Weeber et al. |
| 2009/0210054 A1 | 8/2009 | Weeber et al. |
| 2009/0231546 A1 | 9/2009 | Dai |
| 2009/0234448 A1 | 9/2009 | Weeber et al. |
| 2009/0268155 A1 | 10/2009 | Weeber |
| 2009/0268158 A1 | 10/2009 | Weeber |
| 2009/0275929 A1 | 11/2009 | Zickler |
| 2009/0279048 A1 | 11/2009 | Hong et al. |
| 2009/0281552 A1 | 11/2009 | Hiramatsu et al. |
| 2009/0292354 A1 | 11/2009 | Gontijo et al. |
| 2009/0295295 A1 | 12/2009 | Shannon et al. |
| 2009/0303465 A1 | 12/2009 | Clements et al. |
| 2009/0323020 A1 | 12/2009 | Zhao et al. |
| 2010/0016961 A1 | 1/2010 | Hong et al. |
| 2010/0016965 A1 | 1/2010 | Hong et al. |
| 2010/0082017 A1 | 4/2010 | Zickler et al. |
| 2010/0097569 A1 | 4/2010 | Weeber et al. |
| 2010/0097619 A1 | 4/2010 | Ge et al. |
| 2010/0130888 A1 | 5/2010 | Deacon et al. |
| 2010/0134760 A1 | 6/2010 | Salvati et al. |
| 2010/0161048 A1 | 6/2010 | Schaper, Jr. |
| 2010/0179793 A1 | 7/2010 | Chernyak et al. |
| 2010/0220185 A1 | 9/2010 | Vertoprakhov et al. |
| 2010/0234833 A1 | 9/2010 | Dai |
| 2010/0315589 A1 | 12/2010 | Portney |
| 2011/0080562 A1 | 4/2011 | Izuka et al. |
| 2011/0149236 A1* | 6/2011 | Weeber ............... A61F 2/1654 351/159.01 |
| 2011/0166652 A1 | 7/2011 | Bogaert et al. |
| 2011/0205486 A1 | 8/2011 | Zhao |
| 2011/0211163 A1 | 9/2011 | Meuse et al. |
| 2011/0270596 A1 | 11/2011 | Weeber |
| 2012/0019493 A1* | 1/2012 | Barnhoefer ......... H05B 41/3922 345/207 |
| 2012/0033182 A1 | 2/2012 | Dai |
| 2012/0140166 A1 | 6/2012 | Zhao |
| 2012/0168605 A1 | 7/2012 | Milanovic |
| 2012/0238904 A1 | 9/2012 | Manns et al. |
| 2012/0249955 A1 | 10/2012 | Sarver et al. |
| 2012/0296422 A1 | 11/2012 | Weeber |
| 2012/0310133 A1 | 12/2012 | De, Jr. et al. |
| 2012/0310337 A1 | 12/2012 | Hacker et al. |
| 2013/0050637 A1 | 2/2013 | Roffman et al. |
| 2013/0226294 A1 | 8/2013 | Van et al. |
| 2013/0286351 A1 | 10/2013 | Shimizu |
| 2013/0307965 A1 | 11/2013 | Widman et al. |
| 2013/0314669 A1 | 11/2013 | Levin et al. |
| 2013/0345807 A1 | 12/2013 | Olsen et al. |
| 2014/0016088 A1 | 1/2014 | De et al. |
| 2014/0081395 A1 | 3/2014 | Weeber |
| 2014/0135919 A1 | 5/2014 | Gontijo et al. |
| 2014/0160436 A1 | 6/2014 | Kasthurirangan et al. |
| 2014/0176904 A1 | 6/2014 | Lai |
| 2014/0268042 A1 | 9/2014 | Bor et al. |
| 2014/0293426 A1 | 10/2014 | Dobschal |
| 2014/0320805 A1 | 10/2014 | Wilzbach et al. |
| 2015/0042955 A1 | 2/2015 | Zhao et al. |
| 2015/0062529 A1 | 3/2015 | Kasthurirangan et al. |
| 2015/0138350 A1 | 5/2015 | Videcoq |
| 2015/0216404 A1* | 8/2015 | Zhao ................... A61B 3/0025 356/124 |
| 2015/0250583 A1 | 9/2015 | Rosen et al. |
| 2015/0320547 A1 | 11/2015 | Rosen et al. |
| 2015/0359625 A1 | 12/2015 | Argal et al. |
| 2015/0362746 A1 | 12/2015 | Skudder et al. |
| 2015/0379348 A1 | 12/2015 | Whritenor et al. |
| 2016/0157997 A1 | 6/2016 | Gerlach et al. |
| 2016/0161364 A1 | 6/2016 | Alarcon Heredia et al. |
| 2016/0299355 A1 | 10/2016 | Biemold et al. |
| 2016/0335474 A1 | 11/2016 | Santos-Villalobos et al. |
| 2017/0189233 A1 | 7/2017 | Dewey et al. |
| 2017/0273781 A1 | 9/2017 | Zhao |
| 2018/0104506 A1* | 4/2018 | Kurtz .................. A61F 9/00 |
| 2018/0153681 A1 | 6/2018 | Rosen et al. |
| 2018/0275015 A1 | 9/2018 | Zhao |
| 2019/0164647 A1 | 5/2019 | Rosen |
| 2020/0315848 A1 | 10/2020 | Rosen et al. |
| 2020/0315849 A1* | 10/2020 | Rosen ............... A61F 9/00812 |
| 2021/0275292 A1 | 9/2021 | Rosen et al. |
| 2022/0208379 A1 | 6/2022 | Rosén |
| 2023/0264604 A1 | 8/2023 | Gogna et al. |
| 2024/0374373 A1 | 11/2024 | Alarcon Heredia et al. |

FOREIGN PATENT DOCUMENTS

| | | |
|---|---|---|
| EP | 226400 A2 | 6/1987 |
| EP | 227357 A2 | 7/1987 |
| EP | 0457553 A2 | 11/1991 |
| EP | 0681198 A1 | 11/1995 |
| EP | 0538126 B1 | 9/1996 |
| EP | 0810427 A1 | 12/1997 |
| EP | 0926531 A1 | 6/1999 |
| EP | 0949529 A2 | 10/1999 |
| EP | 957331 A2 | 11/1999 |
| EP | 1424049 A1 | 6/2004 |
| EP | 1857077 A1 | 11/2007 |
| EP | 1310267 B1 | 1/2008 |
| EP | 2631891 A1 | 8/2013 |
| EP | 2653095 A1 | 10/2013 |
| EP | 3059575 A1 | 8/2016 |
| FR | 2745711 A1 | 9/1997 |
| GB | 2433782 A | 7/2007 |
| GB | 2488802 A | 9/2012 |
| JP | 2010200915 A | 9/2010 |
| WO | 8603961 A1 | 7/1986 |
| WO | 9222264 A1 | 12/1992 |
| WO | 9303409 A1 | 2/1993 |
| WO | 9507487 A1 | 3/1995 |
| WO | 9856315 A1 | 12/1998 |
| WO | 9905499 A1 | 2/1999 |
| WO | 0019906 A1 | 4/2000 |
| WO | 0111418 A1 | 2/2001 |
| WO | 0135868 A1 | 5/2001 |
| WO | 0154569 A1 | 8/2001 |
| WO | 0163344 A1 | 8/2001 |
| WO | 0182839 A1 | 11/2001 |
| WO | 0185016 A2 | 11/2001 |
| WO | 0189424 A1 | 11/2001 |
| WO | 0221194 A2 | 3/2002 |
| WO | 0234126 A1 | 5/2002 |
| WO | 02074210 A2 | 9/2002 |
| WO | 03009053 A1 | 1/2003 |
| WO | 04028356 A1 | 4/2004 |
| WO | 2004034129 A1 | 4/2004 |
| WO | 2004053568 A1 | 6/2004 |
| WO | 2004079637 A1 | 9/2004 |
| WO | 2004090611 A2 | 10/2004 |
| WO | 2004096014 A2 | 11/2004 |
| WO | 05019906 A1 | 3/2005 |
| WO | 2005079546 A2 | 9/2005 |
| WO | 06025726 A1 | 3/2006 |
| WO | 2006032263 A2 | 3/2006 |
| WO | 2006047698 A1 | 5/2006 |
| WO | 06060477 A2 | 6/2006 |
| WO | 2006060480 A2 | 6/2006 |
| WO | 2007009294 A1 | 1/2007 |
| WO | 2007067872 A2 | 6/2007 |
| WO | 2007092948 A1 | 8/2007 |
| WO | 2007133384 A2 | 11/2007 |
| WO | 2007142981 A2 | 12/2007 |
| WO | 2008045847 A2 | 4/2008 |

(56) References Cited

FOREIGN PATENT DOCUMENTS

| WO | 2008083283 A2 | 7/2008 |
|---|---|---|
| WO | 2009020963 A1 | 2/2009 |
| WO | 2009029515 A1 | 3/2009 |
| WO | 2009076670 A1 | 6/2009 |
| WO | 2009105567 A1 | 8/2009 |
| WO | 2009137491 A1 | 11/2009 |
| WO | 2010009254 A1 | 1/2010 |
| WO | 2010009257 A1 | 1/2010 |
| WO | 2010028654 A1 | 3/2010 |
| WO | 2012024152 A1 | 2/2012 |
| WO | 2012052585 A1 | 4/2012 |
| WO | 2012074742 A1 | 6/2012 |
| WO | 2012083143 A1 | 6/2012 |
| WO | 2012085917 A1 | 6/2012 |
| WO | 2012154597 A1 | 11/2012 |
| WO | 2012166797 A1 | 12/2012 |
| WO | 2015022215 A1 | 2/2015 |
| WO | 2016032397 A1 | 3/2016 |
| WO | 2016087914 A1 | 6/2016 |
| WO | 2016123167 A1 | 8/2016 |

OTHER PUBLICATIONS

International Search Report and Written Opinion for Application No. PCT/IB2015/002109, mailed on Mar. 15, 2016, 11 pages.

Abelman H., et al. "Tolerance and Nature of Residual Refraction in Symmetric Power Space as Principal Lens Powers and Meridians Change," Computational and Mathematical Methods in Medicine, Article ID 492383, 2014, vol. 2014, pp. 1-12.

Abrahamsson M., et al., "Impairment of Contrast Sensitivity Function (CSF) as a Measure of Disability Glare, " Investigative Ophthalmology & Visual Science, Jul. 1986, vol. 27 (7), pp. 1131-1136.

Alfonso J.F., et al., "Prospective Study of the Acri.LISA Bifocal Intraocular Lens," Journal of Cataract Refractive Surgery, Nov. 2007, vol. 33 (11), pp. 1930-1935.

Alio J.L., et al., "Phakic Anterior Chamber Lenses for the Correction of Myopia: A 7-Year Cumulative Analysis of Complications in 263 Cases," Ophthalmology, Mar. 1999, vol. 106 (3), pp. 458-466.

Apple D.J., et al., "Anterior Chamber Lenses Part 1: Complications and Pathology and a Review of Designs," Journal of Cataract Refractive Surgery, Mar. 1987, vol. 13 (2), pp. 157-174.

Apple D.J., et al., Eds., "Intraocular Lenses: Evolution, Designs, Complications and Pathology," in: New Concepts in Intraocular Lens Implantation, Williams & Wilkins publisher, Jan. 1989, vol. 36 (1), pp. 21-36.

Apple D.J., et al., "Intraocular Lenses: Evolution, Designs, Complications and Pathology," New Concepts in Intraocular Lens Implantation, Williams & Wilkins publisher, Jan. 1989, vol. 22 (36), pp. 205-221.

Aslam, T.M., et al., "Development of a Forced Choice Photographic Questionnaire For Photic Phenomena and Its Testing—Repeatability, Reliability and Validity, " Ophthalmologica, Nov.-Dec. 2004, vol. 218 (6), pp. 402-410.

Baikoff G., et al., "Angle-fixated Anterior Chamber Phakic Intraocular Lens for Myopia 7 to −19 Diopters," Journal of Refractive Surgery, May-Jun. 1998, vol. 14 (3), pp. 282-292.

Baumeister M., et al., "Tilt and Decentration of Spherical and Aspheric Intraocular Lenses: Effect on Higher-Order Aberrations," Journal of Cataract & Refractive Surgery, 2009, vol. 35 (6), pp. 1006-1012.

Beer J.M., et al., "Lasers' Spectral and Temporal Profile Can Affect Visual Glare Disability," Aviation, Space, and Environmental Medicine, Dec. 2012, vol. 83 (12), pp. 1135-1144.

Brainard D.H., The Psychophysics Toolbox, Spatial Vision, vol. 10, pp. 433-436.

Brown W.L., "Revisions to Tolerances in Cylinder Axis and in Progressive Addition Lens Power in ANSI 780.1-2005," Optometry, 2006, vol. 77 (7), pp. 343-349.

Calatayud A., et al., "Imaging Quality of Multifocal Intraocular Lenses: Automated Assessment Setup," Ophthalmic and Physiological Optics, Jul. 2013, vol. 33 (4), pp. 420-426.

Canovas C., et al., "Customized Eye Models for Determining Optimized Intraocular Lenses Power," Biomedical Optics Express, Jun. 1, 2011, vol. 2 (6), pp. 1649-1662.

Canovas C., et al., "Hybrid Adaptive-Optics Visual Simulator," Optical Letters, Jan. 15, 2010, vol. 35 (2), pp. 196-198.

Cheng X., et al., "Predicting Subjective Judgment of Best Focus with Objective Image Quality Metrics," Journal of Vision, Apr. 2004, vol. 4 (4), pp. 310-321.

Cilco Advertisement Brochure, Oct. 1982, 3 pages.

Cohen A.L., "Practical Design of a Bifocal Hologram Contact Lens or Intraocular Lens," Applied Optics, Jul. 1, 1992, vol. 31 (19), pp. 3750-3754.

De Almeida M.S., et al., "Different Schematic Eyes and their Accuracy to the in Vivo Eye: A Quantitative Comparison Study," Brazilian Journal of Physics, Jun. 2007, vol. 37 (2A), 10 pages.

Diffractive Lenses for Extended Depth of Focus and Presbyopic Correction, Presentation from Wavefront Congress held on Feb. 15, 2008, Rochester, New York.

Doskolovich L.L., et al., "Special Diffractive Lenses," Lens and Optical Systems Design, Apr. 1992, vol. 1780, pp. 393-402.

Einighammer H.J., "The Individual Virtual Eye", Dissertation, 2008, 157 pages.

Fernandez E.J., et al., "Adaptive Optics Visual Simulator," Journal of Refractive Surgery, 2002, vol. 18 (5), pp. S634-S638.

Gobbi P.G., et al., "Far and Near Visual Acuity with Multifocal Intraocular Lenses in an Optomechanical Eye Model with Imaging Capability," Journal of Cataract and Refractive Surgery, 2007, vol. 33 (6), pp. 1082-1094.

Gobbi P.G., et al., "Optomechanical Eye Model with Imaging Capabilities for Objective Evaluation of Intraocular Lenses," Journal of Cataract and Refractive Surgery, 2006, vol. 32 (4), pp. 643-651.

Guirao A., et al., "Corneal Wave Aberration from Videokeratography: Accuracy And Limitations of the Procedure," Journal of the Optical Society of America, 2000, vol. 17 (6), pp. 955-965.

Hill W., et al., "Monte Carlo Simulation of Expected Outcomes with the Acrysof Toric Intraocular Lens," BMC Ophthalmology, Oct. 2008, vol. 8, pp. 22.

Jaeken B., et al., "Peripheral Aberrations in the Human Eye for Different Wavelengths: Off-Axis Chromatic Aberration," Journal of the Optical Society of America A, Sep. 2011, vol. 28 (9), pp. 1871-1879.

Javitt J.C., et al., "Validity and Reliability of the Cataract TyPE Spec: an Instrument For Measuring Outcomes of Cataract Extraction," American Journal of Ophthalmology, Aug. 2003, vol. 136 (2), pp. 285-290.

Jendritza B.B., et al., "Wavefront-Guided Excimer Laser Vision Correction after Multifocal IOL Implantation," Journal pf Refractive Surgery, Mar. 2008, vol. 24 (3), pp. 274-279.

Johnson C.A., "Psychophysical Factors that Have Been Applied to Clinical Perimetry," Vision Research, Sep. 2013, vol. 90, pp. 25-31.

Kim J.H., et al., "The Analysis of Predicted Capsular Bag Diameter using Modified Model of Capsule Measuring Ring in Asians," Clinical and Experimental Ophthalmology, Apr. 2008, vol. 36 (3), pp. 238-244.

Kim M.J., et al., "Objective Evaluation of Through-Focus Optical Performance of Presbyopia-Correcting Intraocular Lenses Using an Optical Bench System," Journal of Cataract and Refractive Surgery, 2011, vol. 37 (7), pp. 1305-1312.

Klein S.A., "Optimal Corneal Ablation for Eyes with Arbitrary Hartmann-Shack Aberrations," Journal of the Optical Society of America A, 1998, vol. 15 (9), pp. 2580-2588.

Lesmes L.A., et al., "Bayesian Adaptive Estimation of the Contrast Sensitivity Function: the Quick CSF Method," Journal of Vision, Mar. 2010, vol. 10 (3) 17, pp. 1-21.

Liang J., et al., "Objective Measurement Of Wave Aberrations Of The Human Eye With The Use Of A Hartmann-Shack Wave-Front Sensor," Journal of the Optical Society of America, 1994, vol. 11 (7), pp. 1949-1957.

(56) References Cited

OTHER PUBLICATIONS

Liou H.L., et al., "Anatomically Accurate, Finite Model Eye for Optical Modeling," Journal of Optical Society of America, Aug. 1997, vol. 14 (8), pp. 1684-1695.
Liou H.L., et al., "The Prediction of Spherical Aberration with Schematic Eyes," Ophthalmic and Physiological Optics, Jan. 1996, vol. 16 (4), pp. 348-354.
Marinho A., "Results are Encouraging for Phakic IOLs, but More Work is needed," Refractive Surgery, Feb. 2000, p. 12, 15.
Marsack J.D., et al., "Metrics of Optical Quality Derived from Wave Aberrations Predict Visual Performance," Journal of Vision, Apr. 2004, vol. 4 (4), pp. 322-328.
Menapace R., "The Capsular Tension Rings," Journal of Cataract & Refractive Surgery, Dec. 10, 2008, Chap. 3, pp. 27-44.
Mencucci R., et al., "Clinical outcomes and rotational stability of a 4-haptic toric intraocular lens in myopic eyes," Journal of Cataract & Refractive Surgery, Sep. 2014, vol. 40 (9), pp. 1479-1487.
Monsoriu J.A., et al., "Devil's Lenses," Optics Express, Oct. 17, 2007, vol. 15 (21), pp. 13858-13864.
Morlock, R., et al., "Patient-Reported Spectacle Independence Questionnaire (PRSIQ): Development and Validation," American Journal of Ophthalmology, Jun. 2017, vol. 178, pp. 101-114.
Navarro R., et al., "Accommodation-Dependent Model of the Human Eye with Aspherics," Journal of the Optical Society of America, Aug. 1985, vol. 2 (8), pp. 1273-1281.
Nio Y.K., et al., "Effect of Intraocular Lens Implantation on Visual Acuity, Contrast Sensitivity, and Depth of Focus," Journal of Cataract and Refractive Surgery, Nov. 2003, vol. 29 (11), pp. 2073-2081.
Norrby S., et al., "Model Eyes for Evaluation of Intraocular Lenses," Applied Optics, Sep. 7, 2007, vol. 46 (26), pp. 6595-6605.
Olsen T., "Simple Method to Calculate the Surgically Induced Refractive Change," Journal of Cataract & Refractive Surgery, Mar. 1993, vol. 19 (2), pp. 319-320.
Ortiz, C., et al., "Quantification and Monitoring of Visual Disturbances for patients with cataracts using Halo v1.0 software, " Department of Optics, Laboratory of Vision Sciences and Applications, University of Granada, IWBBIO 2013, Mar. 20, 2013, XP055596332, Proceedings, 8 Pages.
Buckhurst P.J., et al., "Tablet App Halometer for the Assessment of Dysphotopsia," Journal of Cataract and Refractive Surgery, Dec. 2015, vol. 41 (11), pp. 2424-2429.
Peli E., et al., "Appearance of Images Through A Multifocal Intraocular Lens," Journal of the Optical Society of America, 2001, vol. 18 (2), pp. 302-309.
Piers P.A., et al., "Eye Models for the Prediction of Contrast Vision in Patients with New Intraocular Lens Designs," Optics Letters, Apr. 1, 2004, vol. 29 (7), pp. 733-735.
Piers P.A., et al., "Theoretical Comparison of Aberration-Correcting Customized and Aspheric Intraocular Lenses," Journal of Refractive Surgery, Apr. 2007, vol. 23 (4), pp. 374-384.
Praeger D.L., "Praeger Technique for the Insertion of the Copeland Radial IOL Posterior Chamber Placement," Copeland Lens, 1982, 7 pages.
Rosen R., et al., "A Bayesian Method Using through Focus Visual Acuity to Predict Rates of Spectacle Wear for Pseudophakic patients," Investigative Ophthalmology & Visual Science, Jul. 2018, vol. 59 (9), pp. 1075, ARVO Annual Meeting Abstract, Retrieved from the Internet: (URL: https://iovs.arvojournals.org/article.aspx?articleid=2693341&resultClick=1).

Siedlecki D., et al., "Radial Gradient index Intraocular Lens: a Theoretical Model," Journal of Modern Optics, 20 Feb.-Mar. 10, 2008, vol. 55 (4-5), pp. 639-647.
Strenn K., et al., "Capsular bag Shrinkage after Implantation of an Open-Loop Silicone Lens and a Poly(methyl methacrylate) Capsule Tension Ring," Journal of Cataract and Refractive Surgery, Dec. 1997, vol. 23 (10), pp. 1543-1547.
Tehrani M., et al., "Capsule Measuring Ring to Predict Capsular Bag Diameter and Follow its Course after Foldable Intraocular Lens Implantation," Journal of Cataract Refractive Surgery, Nov. 2003, vol. 29 (11), pp. 2127-2134.
Terwee T., et al., "Visualization of the Retinal Image in an Eye Model With Spherical and Aspheric, Diffractive, and Refractive Multifocal Intraocular Lenses," Journal of Refractive Surgery, Mar. 2008, vol. 24 (3), pp. 223-232.
Van Den Berg T.J., "Analysis of Intraocular Straylight, Especially in Relation to Age," Optometry and Vision Science, Feb. 1995, vol. 72 (2), pp. 52-59.
Van der Mooren, M., et al. "Combining in Vitro Test Methods for Measuring Light Scatter in Intraocular Lenses." Biomedical Optics Express, 2011, vol. 2 (3), pp. 505-510.
Van Meeteren A., "Calculations on the Optical Modulation Transfer Function of the Human Eye for White Light," Optica Acta, May 1974, vol. 21 (5), pp. 395-412.
Vass C., et al., "Prediction of Pseudophakic Capsular bag Diameter based on Biometric Variables," Journal of Cataract and Refractive Surgery, Oct. 1999, vol. 25 (10), pp. 1376-1381.
Villegas E.A., et al., "Correlation between Optical and Psychophy, Sical Parameters as a Function of Defocus," Optometry and Vision Science, Jan. 1, 2002, vol. 79 (1), pp. 60-67.
Vitale S., et al., "The Refractive Status and Vision Profile: A Questionnaire to Measure Vision-Related Quality of Life in Persons with Refractive Error," Ophthalmology, Aug. 2000, vol. 107 (8), pp. 1529-1539.
Weeber H.A., et al., "Influence of Corneal Aberrations on Dysphotopsia with Multifocal IOLs," ARVO, 2011, Abstract.
Weeber H.A., et al., "Influence of Corneal Aberrations on Dysphotopsia with Multifocal IOLs," RD3115, 2011.
Weeber H.A., et al., "Optical and Visual Performance of Patient Populations Implanted with Monofocal and Multifocal IOLs in the Presence of Defocus," Investigative Ophthalmology & Visual Science, 2010, vol. 51, E-Abstract 5751.
Weeber H.A., et al., "Population-based Visual Acuity in the Presence of Defocus Well Predicted By Classical Theory," Journal of Biomedical Optics, 2010, vol. 15 (4), pp. 040509.
Weeber H.A., et al., "Theoretical Performance of Intraocular Lenses Correcting Both Spherical and Chromatic Aberration," Journal of Refractive Surgery, 2012, vol. 28 (1), pp. 48-52.
ISO 11979-2, "Part 2—Optical Properties and Test Methods—Ophthalmic Implants—Intraocular Lenses", International Organization for Standardization, Edition 2, 30 pages, Aug. 15, 2014.
Pelli, Denis G., "The VideoToolbox Software for Visual Psychophysics: Transforming Numbers into Movies", Spatial Vision, vol. 10, No. 4, pp. 437-442, 1997.
Rosales et al., "Customized Computer Models Of Eyes With Intraocular Lenses", Optics Express, vol. 15, No. 5, pp. 2204-2218, Mar. 5, 2007.
Holladay et al., "Negative Dysphotopsia: the Enigmatic Penumbra", Journal Cataract and Refractive Surgery, vol. 38, No. 7, pp. 1251-1265, 2012.

\* cited by examiner

RING HALOMETER SYSTEM AND METHOD FOR QUANTIFYING DYSPHOTOPSIAS

CROSS-REFERENCE TO RELATED APPLICATIONS

This application claims priority to U.S. Provisional Patent Application No. 63/184,709, filed on May 5, 2021, the entire contents of which are hereby incorporated by reference.

BACKGROUND

1. Field

The present disclosure relates to a ring halometer system and a method for quantifying dysphotopsias experienced by a patient having an intraocular lens implant.

2. Description of Related Art

An intraocular lens (IOL) implant is an artificial lens used to replace the natural lens of the eye that has developed cataracts. These IOL implants may be surgically placed by extracting the natural lens of the eye from the capsular bag of the eye and then inserting the IOL into the capsular bag. A variety of different types of IOL implants exist, including monofocal IOLs, presbyopia correcting IOLs (e.g., multifocal or extended range of vision IOLs), accommodating IOLs that are configured to focus through engagement with the ciliary muscle in the eye, and toric IOLs.

Dysphotopsias (e.g., unwanted entopic phenomena, such as glare, halos, and/or starbursts) are a common source of patients' complaints after cataract and refractive surgery. In general, presbyopia correcting IOLs, such as multifocal or extended range of vision IOLs, produce higher levels of dysphotopsias than monofocal lenses. Although most patients tend to adapt over time, these entopic phenomena remain the leading cause for IOL explantation (i.e., secondary correction of an undesirable post-operative entopic phenomena) in patients implanted with a presbyopia-correcting IOL.

Conventionally, the impact of dysphotopsias in the quality of life of IOL implant patients is assessed through clinical questionnaires to quantify the frequency and level of bothersome and/or severity of the halos, glares, and/or starbursts. However, these questionnaires are strongly subjective, highly variable between different studies and sites, and require large number of patients.

Although not commonly used in the clinical practice, some visual tests have been proposed to evaluate dysphotopsias in a more quantitative way. For example, the Rostock-Glare perimeter test and the Aston Glare perimeter test are able to measure different levels of dysphotopsias to distinguish between different intraocular lens technologies. However, these methodologies are based on a perimetry technique in which one location of the visual field is tested at a time until a map of the visual field is completed. Accordingly, these methodologies are quite time consuming, typically requiring approximately 10 minutes to complete. Additionally, during the time that the test is performed using these conventional methodologies, the patient must look at a screen with a very strong light source, concentrated in the test and without changing his position. These factors, combined with the average age of the cataract patients, limit the widespread adoption of these techniques in a clinical environment.

SUMMARY

The present disclosure relates to various embodiments of a ring halometer system configured to quantify dysphotopsias in a patient, such as a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or in a patient wearing contact lenses. In one embodiment, the system includes a white screen and a first light source configured to emit a glare source (i.e., an extended source of light) from the white screen. The glare source is configured to form a veil of light visible to the patient due to the light scattered from an optical surface of the patient's eye. The system also includes a second light source (stimulus) configured to project a light ring concentric with the glare source emitted from the first light source on the white screen, and a controller coupled to the second light source configured to adjust a size of the light ring. Both the glare source and second light source are controlled by an electronic device.

The system may also include a user input device of the electronic device configured to record an indication from the patient when the size of the light ring is substantially equal to a size of the veil of light.

A memory device of the electronic device may include instructions which, when executed by a processor of the electronic device, cause the processor to determine a level of bothersomeness of the dysphotopsias experienced by the patient based on the size of the light ring.

The first light source may include a light-emitting diode (LED) and the second light source may be a projector. The light ring may be a white ring or a color ring. The first light source may include a spectrum filter to select a desired emitting spectrum of the glare source.

The system may also include a lux meter configured to automatically calibrate an illuminance of the light ring projected on the white screen by the second light source and/or to automatically calibrate an illuminance of the glare source emitted by the first light source.

The system may include a lux meter configured to check a calibration of an illuminance of the light ring projected on the white screen by the second light source and/or to check a calibration of an illuminance of the glare source emitted by the first light source.

The system may also include a controller configured to adjust the illuminance of the first light source. The illuminance of the glare light source emitted by the first light source may be in a range from approximately 1 lux to approximately 100 lux, or more preferably from approximately 20 lux to approximately 80 lux.

A luminance of the light ring emitted by the second light source may be in a range from approximately 0.5 cd/m² to approximately 110 cd/m² or more preferably from 1 cd/m² to approximately 25 cd/m².

The present disclosure also relates to various embodiments of a computer-implemented method of quantifying dysphotopsias in a patient after intraocular lens implantation. In one embodiment, the method includes emitting, from a first light source, a glare source surrounded by a white screen. The glare source generates a veil of light in a retina of the patient. The method also includes displaying, with a second light source, a light ring on the white screen concentric with the glare source, varying a diameter of the light ring displayed on the white screen, and receiving an indication, from the patient, in response to the diameter of the light ring being substantially equal to a diameter of the veil of light.

Varying of the diameter of the light ring may include increasing the diameter of the light ring and/or decreasing the diameter of the light ring.

The method may also include quantifying a level of bothersomeness of the dysphotopsias experienced by the patient based on the diameter of the light ring following receipt of the indication from the patient.

The method may also include measuring, with a light meter, an illuminance of the glare light source from the first light source and/or the illuminance of the light ring on the white screen, and adjusting the illuminance of the glare light source and/or the illuminance of the light ring.

The method may also include measuring, with a light meter, an illuminance of the glare light source from the first light source and/or the illuminance of the light ring on the white screen, and checking if a calibration of the illuminance of the glare light source and/or the illuminance of the light ring is correct.

In another embodiment, a computer-implemented method of quantifying dysphotopsias in a patient includes viewing a glare light source emitted from a white screen, the glare light source generating a veil of light in the patient's retina, viewing a light ring on the white screen concentric with the glare light source, and adjusting a size of the light ring until a diameter of the light ring is substantially equal to a diameter of the veil of light.

The method may also include entering a selection, with a user-input device, in response to the diameter of the light ring being substantially equal to the diameter of the veil of light.

Adjusting the size of the light ring may include increasing the diameter of the light ring until the light ring is visible from the veil of light and/or decreasing the diameter of the light ring until the light ring disappears into the veil of light.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of quantifying dysphotopsias experienced by a patient, such as a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or in a patient wearing contact lenses.

BRIEF DESCRIPTION OF THE DRAWINGS

The accompanying drawings, together with the specification, illustrate exemplary embodiments of the present disclosure, and, together with the description, serve to explain the principles of the present disclosure. The drawings are not necessarily drawn to scale.

DETAILED DESCRIPTION

The present disclosure relates to various embodiments of systems and methods for quantifying the impact (e.g., the level of bothersomeness) of various dysphotopsias (e.g., entopic phenomena, such as glare, halos, and/or starbursts) experienced by a patient. The systems and methods of the present disclosure may be used to quantify the impact of various dysphotopsias in a patient, for example, after a refractive surgery that is expected to result in increased dysphotopsias, such as cataract and refractive surgery to implant a presbyopia-correcting intraocular lens (IOL), after corneal refractive surgery (e.g., LASIK or presby-LASIK), cornea reshaping (orthokeratology) to treat keratoconus, or in a patient wearing contact lenses (multifocal or other types). The systems and methods of the present disclosure are configured to quantify the impact (e.g., the bothersomeness) of dysphotopsias in a patient with an IOL in an objective manner and more quickly than conventional perimetry techniques, such as the Rostock-Glare perimeter test and the Aston Glare perimeter test.

Figure 1A:
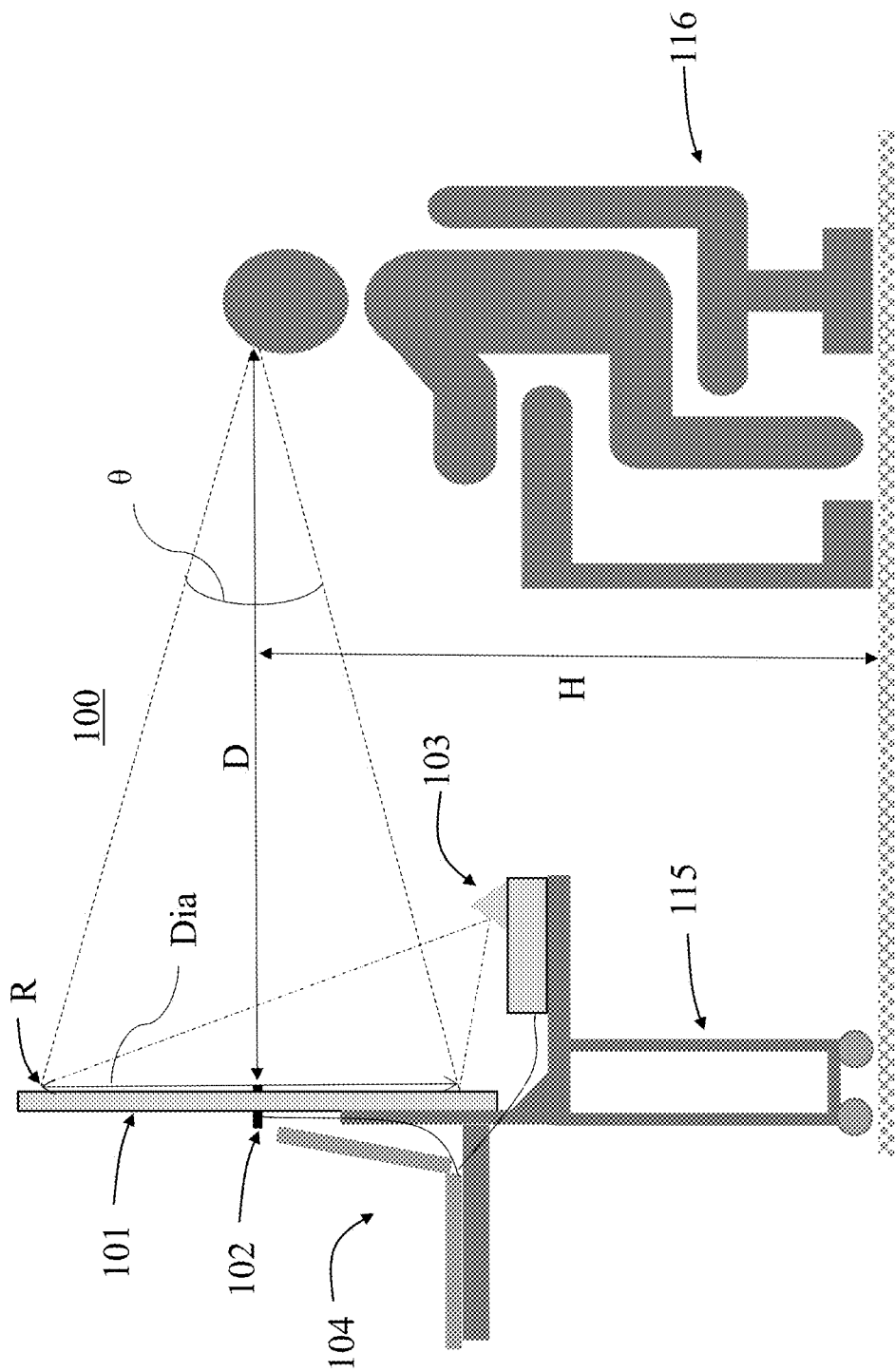
FIGS. 1A-1C are schematic side views and a schematic front view, respectively, of a ring halometer system according to one embodiment of the present disclosure configured to enable performance of a test to quantify the impact of various dysphotopsias experienced by a patient, such as a patient with an intraocular lens (IOL) implant.
Figure 1B:
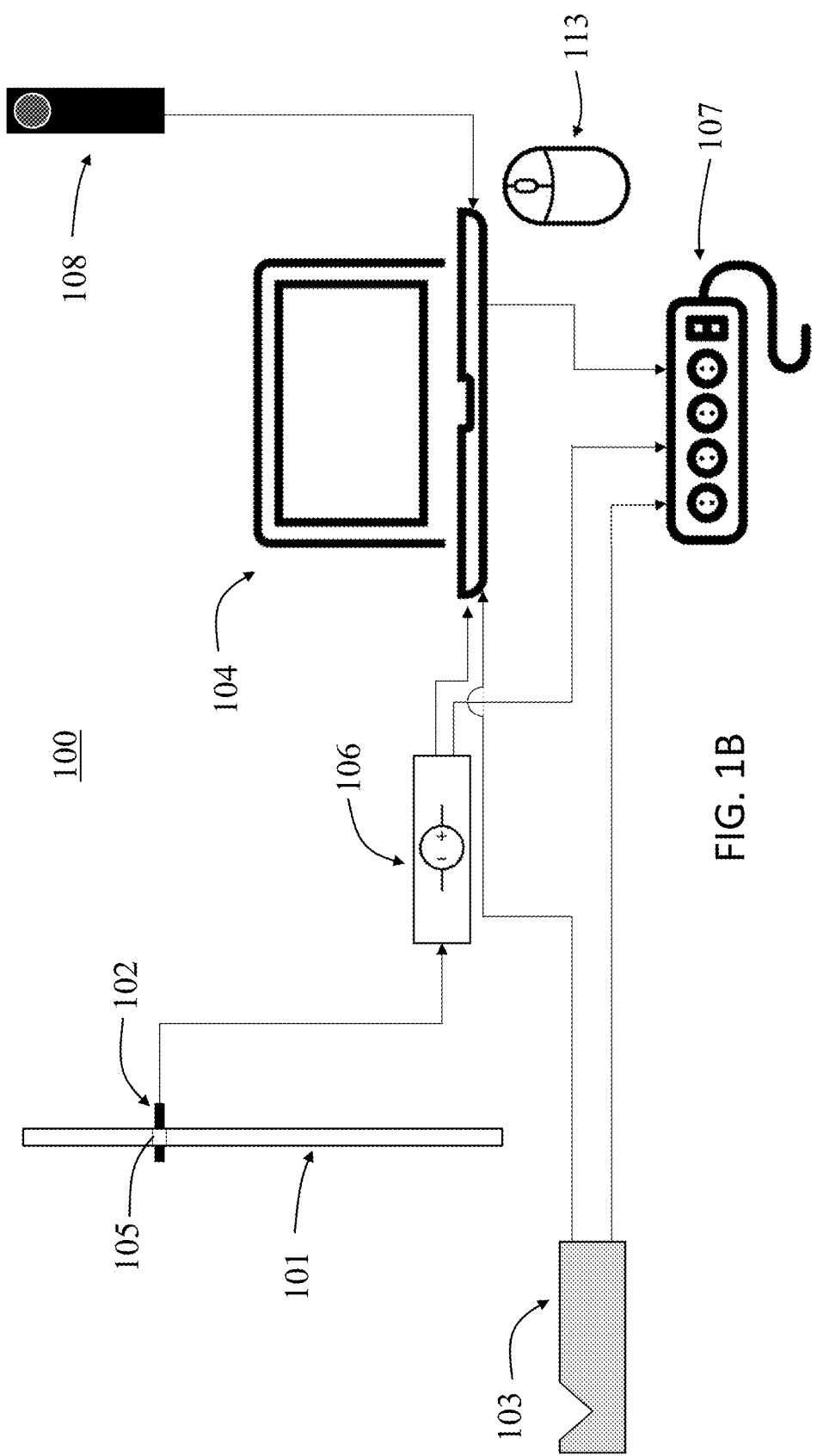
Figure 1C:
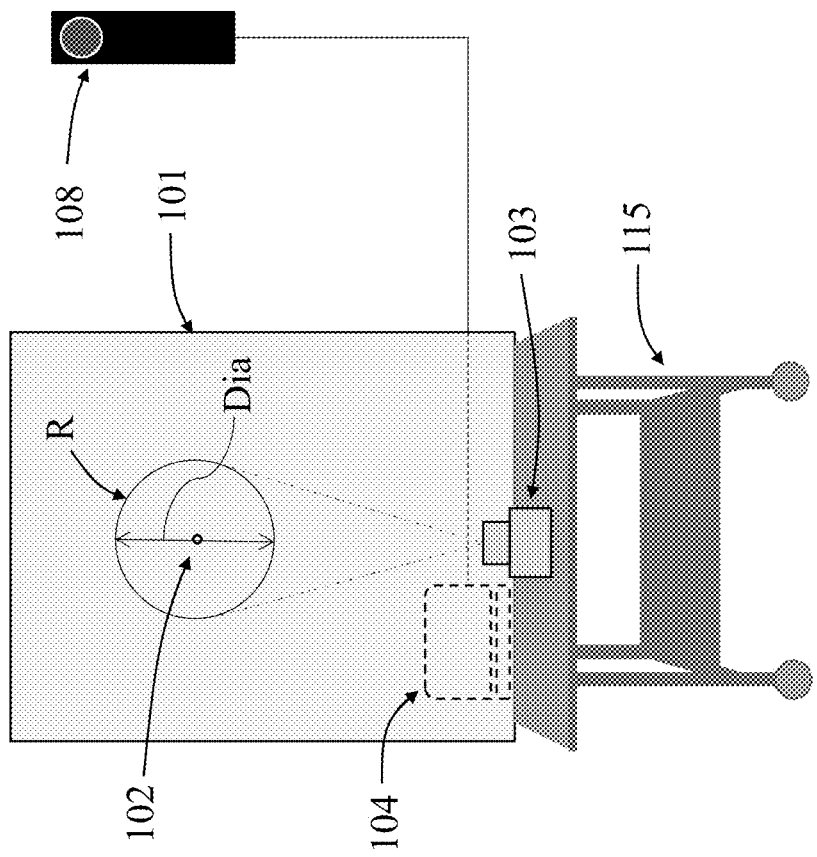
Figure 1C:
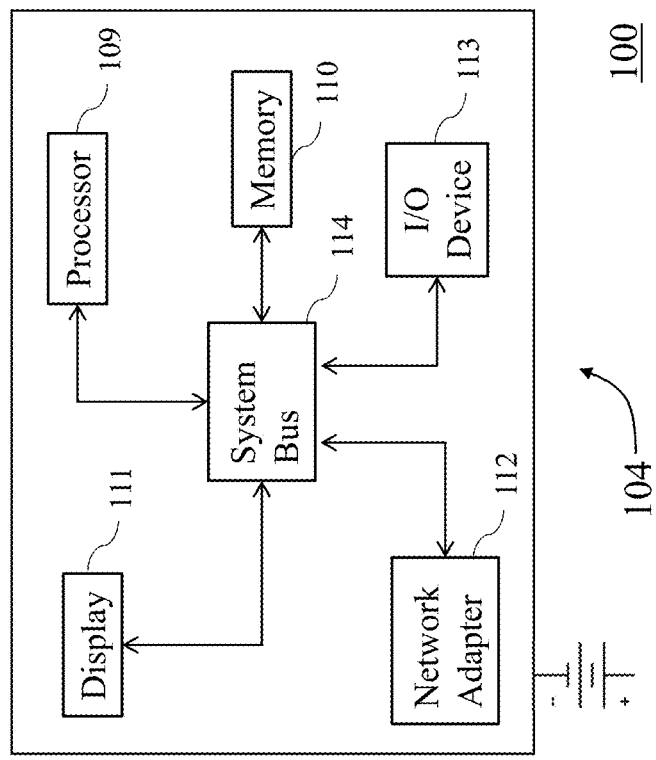

FIGS. 1A-1C depict a ring halometer system 100 according to one embodiment of the present disclosure configured to quantify the impact (e.g., the level or degree of bothersomeness) of dysphotopsias (e.g., entopic phenomena, such as glare, halos, and/or starbursts) in a patient (e.g., dysphotopsias experienced by a patient after refractive surgery, such as cataract and refractive surgery to implant a presbyopia-correcting intraocular lens (IOL), after corneal refractive surgery, such as LASIK or presby-LASIK, after cornea reshaping (orthokeratology) to treat keratoconus, or in a patient wearing contact lenses). In the illustrated embodiment, the system 100 includes a screen 101 (e.g., a white screen, such as a white foamboard), a first light source 102 (e.g., at least one light-emitting diode (LED) with adjustable illuminance levels) configured to emit a glare light source (i.e., an extended source of light) from the screen 101, a second light source (stimulus) 103 (e.g., a projector, such as a short throw or an ultra-short throw projector) configured to project a light ring on a front surface of the screen 101 concentric (or substantially concentric) with the first light source 102, and an electronic device 104 electrically connected to the first light source 102 and the second light source 103. In the illustrated embodiment, the first light source 102 is at least partially housed in an opening 105

(e.g., a hole) in the screen 101, and the second light source 103 and the electronic device 104 are provided on opposite sides of the screen 101.

In the illustrated embodiment, the system 100 also includes a power source 106 coupled to the first light source 102. In one or more embodiments, the power source 106 is configured to adjust the illuminance of the first light source 102. Additionally, in the illustrated embodiment, the first light source 102, the second light source 103, the electronic device 104 are connected to a power strip 107 (e.g., a surge protector) that is connected to an external power source.

In the illustrated embodiment, the system 100 also includes a lux meter 108 (i.e., a light meter) configured to measure the illuminance of the first light source 102 and/or the second light source 103 in lux (i.e., the lux meter 108 is configured to measure the luminous flux per unit area of the first light source 102 and/or the second light source 103). The illuminance of the first light source 102 and/or the second light source 103 measured by the lux meter 108 may be transmitted to the electronic device 104, and the electronic device 104 may be utilized to adjust (i.e., increase or decrease) the illuminance of the first light source 102 and/or the second light source 103. In one or more embodiments, the system 100 may include a controller separate from the electronic device 104 configured to adjust the illuminance of the first light source 102 and/or the second light source 103. In one or more embodiments, the illuminance of the glare source emitted by the first light source 102 may be adjusted in a range from approximately 1 lux to approximately 100 lux, or more preferably from approximately 20 lux to approximately 80 lux. In one or more embodiments, the luminance of the light ring emitted by the second light source 103 may be in a range from approximately 0.5 cd/m$^2$ to approximately 110 cd/m$^2$ or more preferably from 1 cd/m$^2$ to approximately 25 cd/m$^2$.

The electronic device 104 may be a desktop computer, a laptop computer, a tablet computer, a wearable electronic device, or a "smart" cellular device. The electronic device 104 includes a processor 109, computer-readable memory 110, a display 111 configured to display images, a network adapter 112 configured to communicate with other devices over a network, and one or more input/output (I/O) devices 113 (e.g., a keyboard and a mouse). In the illustrated embodiment, the processor 109, the memory 110, the display 111, the network adapter 112, and the input/output (I/O) device(s) 113 communicate with one another over a system bus 114. In one or more embodiments, the memory device 110 may include persistent memory, such as NAND flash memory, for storing instructions.

One of the I/O devices 113 of the electronic device 104 is configured to enable the patient to adjust the diameter of the light ring displayed on the screen 101 by the second light source 103 (i.e., the I/O device 113 enables the patient to increase and decrease the diameter of the light ring displayed on the screen 101). In one or more embodiments, the system 100 may include a controller separate from the electronic device 104 configured to enable the patient to adjust the diameter of the light ring displayed on the screen 101 by the second light source 103.

One of the I/O devices 113 of the electronic device 104 is configured to enable the patient to indicate (e.g., transmit a signal to the electronic device 104) when the diameter of the light ring on the screen 101 is equal or substantially equal to the diameter of a veil of light, which is generated when the light from the first light source 102 interacts with an optical surface of the patient's eye (e.g., the IOL implanted in the patient), the significance of which is described below.

In one or more embodiments, the first light source 102 may include a spectrum filter such that the light emitted from the second light source 102 has a desired emitting spectrum. The light ring projected on the screen 101 by the second light source 103 may be at least one white ring and/or at least one color ring. Although in the illustrated embodiment the second light source 103 is configured to project a light ring on the screen 101, in one or more embodiments the second light source 103 may be configured to project any other suitable shape on the screen 101, such as, for instance, an annular segment (e.g., a semi-circle or an arc) that can increase and decrease in size, a radial segment that can expand and contract in length, Gabor gratings of different contrast levels at different eccentricities and with different dimensions to conduct a perimetry-like contrast sensitivity test, white spots at different eccentricities to perform a perimetry-like test, and/or natural (real) scene images (e.g. a traffic scene or a street at night) to conduct a more functional assessment.

In one or more embodiments, the ring halometer system 100 also includes a support 115 (e.g., a desk, table, or a cart) supporting screen 101, the first light source 102, the second light source 103, and the electronic device 104. Additionally, in the illustrated embodiment, the ring halometer system 100 includes a chair or other platform 116 to enable a patient (i.e., a user having an IOL implant) to sit in front of the screen 101. In one or more embodiments, the height of the support 115 and/or the platform 116 may be configured or adjusted such that the eyeline of the patient is aligned or substantially aligned with the first light source 102 (i.e., the height of the patient's eyeline from the ground and the height of the first light source 102 from the ground are equal or substantially equal). Furthermore, in one or more embodiments, the height of the screen 101 and the first light source 102 positioned thereon may be adjusted depending, for instance, on the visual field to be measured and the distance to the patient. In one or more embodiments, the platform 116 (e.g., the chair) may be adjusted and positioned such that the patient's eye is at a distance D of approximately 2.5 m from the screen 101 and the first light source 102, although in one or more embodiments the platform 116 (e.g., the chair) may be positioned such that the patient's eye is at any other suitable distance D from the screen 101 and the first light source 102 and the size of the light ring projected by the second light source 103 may be adjusted accordingly. In one or more embodiments, the platform 116 (e.g., the chair) may be adjusted such that the patient's eye is at a height H of approximately 125 cm from the floor such that the patient's eye is vertically aligned with the first light source 102, although in one or more embodiments the platform 116 (e.g., the chair) may be such that the patient's eye is at any other suitable height H from the floor depending on the height of the first light source 102 from the floor.

Figure 2:
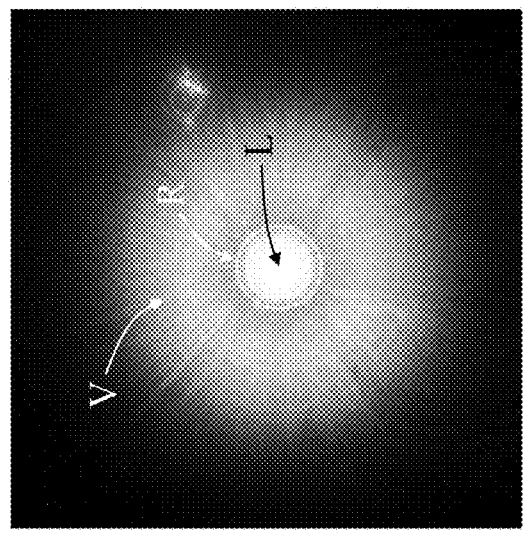
FIG. 2 depicts a veil of light and a light ring viewed by a patient implanted with an IOL during a test utilizing the ring halometer system of FIGS. 1A-1C.
Figure 2:
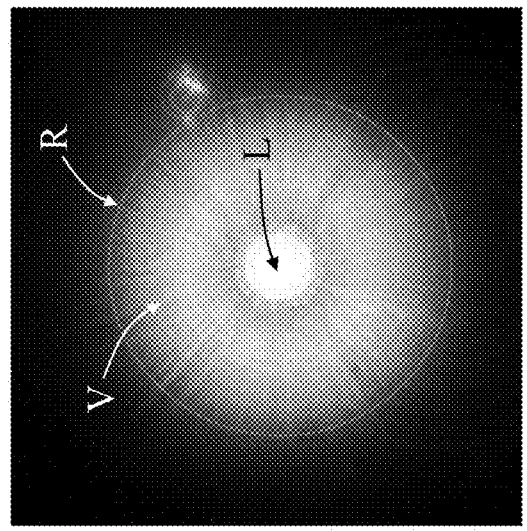

During performance of a test utilizing the ring halometer system 100, a patient (e.g., a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or a patient wearing contact lenses) faces the screen 101 (e.g., by sitting in the chair 116) at a distance D and a height H such that the patient's eye level is substantially aligned with the first light source 102 (e.g., the patient's eye level is centered or substantially centered on the screen 101). Once the patient is facing the screen 101 and the first light source 102 of the system 100 is turned on, the first light source 102 emits a source of light L from the plane of the screen 101, which functions as a glare source. When the light L emitted from the first light source 102 refracts, reflects, and/or passes through an optical surface of the patient's eye (e.g., the IOL implanted in the patient's eye), it generates a veil of light in the patient's retina. FIG. 2 depicts what the patient perceives during the test utilizing the ring halometer system 100. In the illustrated embodiment, the patient views the glare light source L emitted from the first light source 102, the veil of light V that is visible to the patient when the glare light source L emitted from the first light source 102 refracts, reflects, and/or passes through an optical surface of the patient's eye (e.g., the IOL implanted in the patient's eye), and the ring of light R projected by the second light source 103 that is concentric with the glare light L and the veil of light V. In the illustrated embodiment, the veil of light V includes a starburst pattern and a halo. As described in more detail below, the diameter of the veil of light L corresponds or correlates with the impact (e.g., the level of bothersomeness) of various dysphotopsias (e.g., entopic phenomena, such as glare, halos, and/or starbursts) experienced by the patient due to, for example, the IOL.

The patient may then adjust the diameter of the light ring R projected on the screen 101 utilizing one of the I/O devices 113 of the electronic device 104 (e.g., a mouse and/or keyboard) or a separate controller coupled to the second light source 103. In one embodiment, the diameter of the light ring R is initially smaller than the diameter of the veil of light V, and the patient may increase the diameter of the light ring R until the light ring R becomes visible from behind the veil of light V (i.e., the patient may use one of the I/O devices 113 of the electronic device 104 or the separate controller to increase the diameter of the light ring R until the diameter of the light ring R is equal or substantially equal to the diameter of the veil of light V). In one embodiment, the diameter of the light ring R is initially larger than the diameter of the veil of light V, and the patient may decrease the diameter of the light ring R until the light ring R disappears into the veil of light V (i.e., the patient may use one of the I/O devices 113 of the electronic device 104 or the separate controller to decrease the diameter of the light ring R until the diameter of the light ring R is equal or substantially equal to the diameter of the veil of light V). In one or more embodiments, the diameter of the light ring R is equal (or substantially equal) to the diameter of the veil of light V when the light ring R has the smallest diameter such that the light ring R is still discernible from the veil of light V.

Once the diameter of the light ring R is equal or substantially equal to the diameter of the veil of light V (e.g., the light ring R appears from the veil of light V or disappears into the veil of light V), the patient may stop adjusting the diameter of the light ring R and then indicate or otherwise signal (e.g., by making a selection with the one of the I/O devices 113 of the electronic device 104, such as the mouse) that the diameter of the light ring R is equal or substantially equal to the diameter of the veil of light V.

Figure 3:
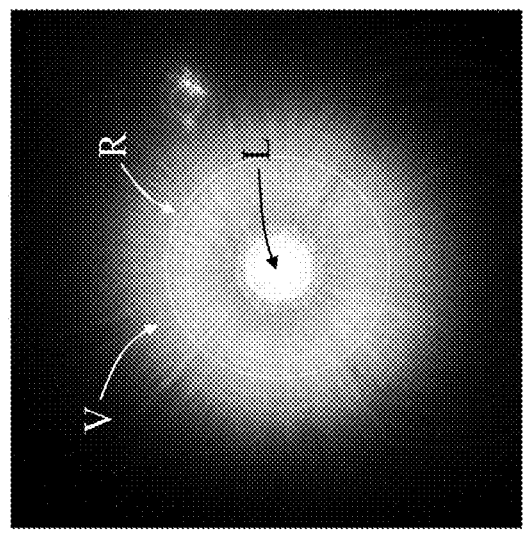
FIG. 3 depicts a veil of light and a light ring viewed by a patient implanted with an IOL during a test utilizing the ring halometer system of FIGS. 1A-1C, in which the illuminance of the light ring has been increased relative to the illuminance of the light ring depicted in FIG. 2.

In one or more embodiments, the illuminance of the first light source 102 and/or the second light source 103 may be adjusted and then the patient may repeat the tasks of adjusting the diameter of the light ring R and then indicating when the diameter of the light ring R is equal or substantially equally to the diameter of the veil of light V. FIG. 3 depicts a veil of light V and a light ring R viewed by a patient (e.g., a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or in a patient wearing contact lenses) during a test utilizing the ring halometer system 100 of FIGS. 1A-1C, in which the illuminance of the light ring R has been increased relative to the illuminance of the light ring R depicted in FIG. 2 to evaluate the scatter level of the different structures in the dysphotopsia profile, as described in more detail below.

Based on the signal received from the patient indicating that the diameter of the light ring R is equal or substantially equal to the diameter of the veil of light V, the electronic device 104 is configured to determine (e.g., measure or calculate) the level of impact (e.g., the level of bothersomeness) of the dysphotopsias experienced by the patient. In one or more embodiments, the memory device 110 of the electronic device 104 stores instructions which, when executed by the processor 109, cause the processor 109 to calculate or determine the visual angle, θ (in degrees) subtended by the light ring R when the patient indicates that the diameter of the light ring R is equal or substantially equal to the diameter of the veil of light V perceived by the patient. The visual angle, θ, is determined according to Equation (1) as follows:

$$\theta = 2*\tan^{-1}\left(\frac{Dia}{2D}\right), \quad \text{(Equation 1)}$$

where Dia is the diameter of the light ring, and D is the distance from the patient (e.g., the pupil or IOL of the patient) to the screen 101, as illustrated in FIGS. 1A and 1C. The memory device 110 of the electronic device 104 also stores instructions which, when executed by the processor 109, cause the processor 109 to calculate or determine the correspondent scatter level, Scatter, when the patient indicates that the diameter Dia of the light ring R is equal or substantially equal to the diameter of the veil of light V perceived by the patient. The scatter level, Scatter, is determined according to Equation (2) as follows:

$$\text{Scatter} = \frac{Lv}{Ev}*\theta^2, \quad \text{(Equation 2)}$$

where Lv is the luminance of the light ring R (emitted from the second light source 103) and Ev is the illuminance of the glare source (emitted from the first light source 102) measured at the plane of the patient's eye. The scatter level Scatter calculated according to Equation 2 above can be used to evaluate the scatter levels created by an optical surface of the patient's eye (e.g., an IOL). In one or more embodiments, the luminance Lv of the light ring R and/or the illuminance Ev of the glare source may be adjusted to different levels to measure the scatter level Scatter at one or more visual angles θ (i.e., the scatter profile can be measured in vivo by adjusting the illuminance of the glare source and the luminance of the light ring). In one or more embodiments, the patient may repeatedly perform the task of adjusting the light ring R (e.g., increasing and/or decreasing the diameter of the light ring R) until the diameter Dia of the light ring R is equal (or substantially equal) to the diameter of the veil of light V, and the visual angle θ and scatter level Scatter determined according to Equations 1 and 2 above may be averaged across the tests. The scatter level created by an IOL is described in van der Mooren, Marrie, et al. "Combining in vitro test methods for measuring light scatter in intraocular lenses." *Biomedical optics express* 2.3 (2011): 505-510, the entire content of which is incorporated herein by reference.

In one or more embodiments, the memory device 110 of the electronic device 104 may store a lookup table associating different visual angles θ (or different ranges of visual angles θ) with different levels of bothersomeness of the dysphotopsias. In one or more embodiments, the level of bothersomeness may range from 1 (low level bothersomeness) to 5 (high level bothersomeness), although in one or more embodiments any other suitable scale may be utilized.

Figures 4A, 4B:
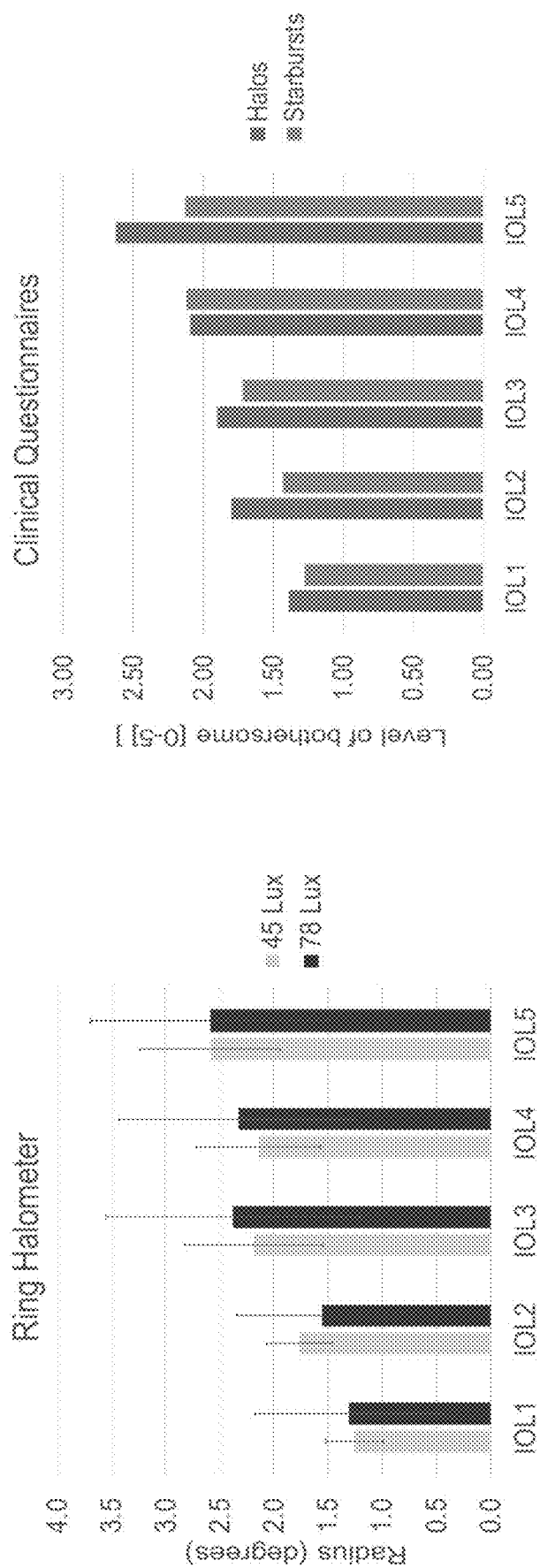
FIG. 4A is a graph depicting the radius of the light ring, determined by a test utilizing the ring halometer system of FIGS. 1A-1C, for each of five different IOLs and at two different illuminance levels of the first light source.
FIG. 4B is a graph depicting the level of bothersomeness of halos and starbursts in five different IOLs, as determined from clinical questionnaires of patients with these IOLs.

FIG. 4A is a graph depicting the visual angle θ (in degrees) subtended by the light ring R when the patient indicates that the diameter Dia of the light ring R is equal or substantially equal to the diameter of the veil of light V, as determined by a test utilizing the ring halometer system 100 of FIGS. 1A-1C, for each of five different IOLs (labeled IOL1, IOL2, IOL3, IOL4, and IOL5) at two different illuminance levels (45 lux and 78 lux) of the first light source 102 (which generates the glare source L emitted from the plane of the screen 101 and the veil of light V visible by the patient).

FIG. 4B is a graph depicting the level of bothersomeness, on a scale of 1 (least bothersome) to 5 (most bothersome), of halos and starbursts in each of the same five different IOLs (labeled IOL1, IOL2, IOL3, IOL4, and IOL5), as determined from clinical questionnaires of patients with these IOLs.

As illustrated in FIGS. 4A and 4B, there is a strong correlation between the level of bothersomeness as determined utilizing the ring halometer system 100 depicted in FIGS. 1A-1C and the level of bothersomeness as indicated by the patients on the clinical questionnaires. The table below lists the coefficient of determination ($R^2$) between the level of bothersomeness as determined by the clinical questionnaires and as determined by a test utilizing the ring halometer system 100 for each of two dysphotopsias (halos and starbursts) at two different levels of intensity (45 lux and 78 lux). As shown in the table below, there is a very strong correction (0.96) between the level of bothersomeness of halos and starbursts as determined by the clinical questionnaires and the level of bothersomeness of the halos and starbursts when measured utilizing the ring halometer system 100 at an illuminance of 45 lux. The table also shows a strong correlation (0.91) between the level of bothersomeness of halos as determined by the clinical questionnaires and the level of bothersomeness of the halos when measured utilizing the ring halometer system 100 at an illuminance of 78 lux, and a moderately strong correlation (0.74) between the level of bothersomeness of starbursts as determined by the clinical questionnaires and the level of bothersomeness of the starbursts when measured utilizing the ring halometer system 100 at an illuminance of 78 lux.

| Coefficient of Determination $R^2$ | Halo | Starburst |
| --- | --- | --- |
| Halometer 45 Lux vs Clinical | 0.96 | 0.96 |
| Halometer 78 Lux vs Clinical | 0.91 | 0.74 |

Figure 5:
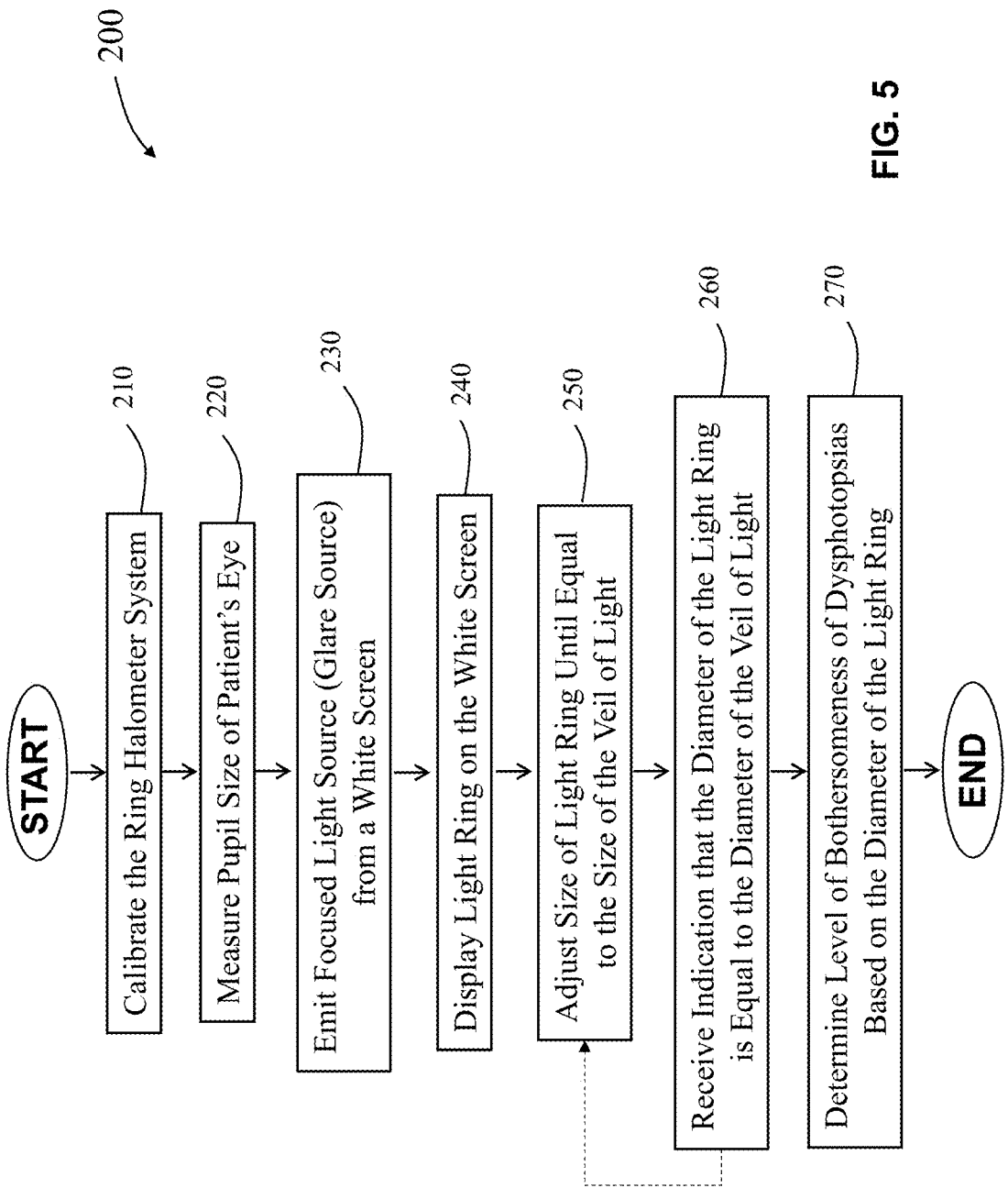
FIG. 5 is a flowchart illustrating tasks of a method of quantifying the impact of dysphotopsias in a patient with an IOL.
Figure 6B:
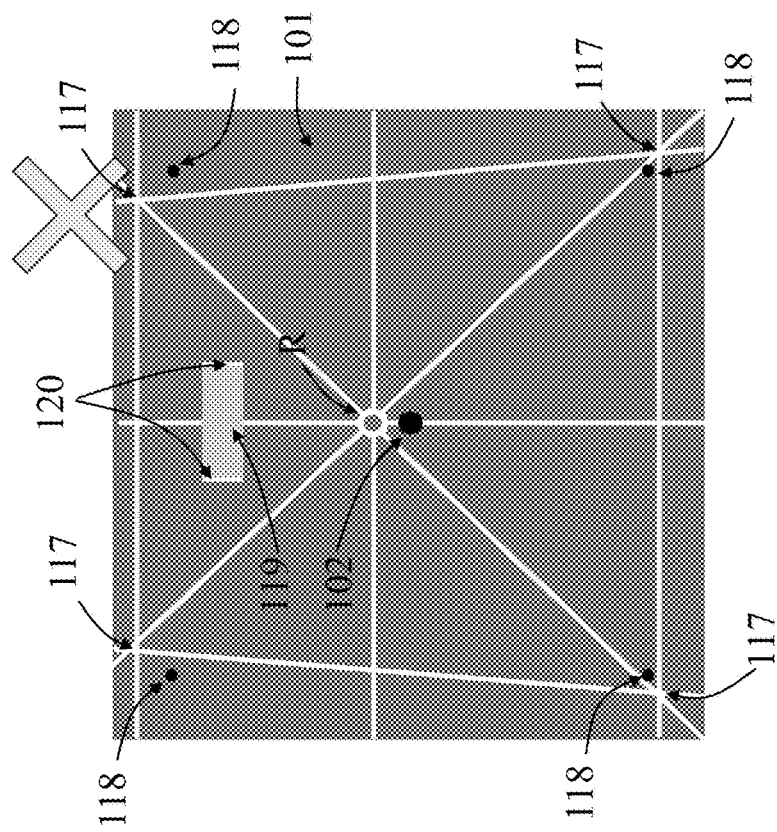
FIGS. 6A-6B depict a task of aligning a light ring with a glare source prior to performance of a test quantifying the impact of dysphotopsias in a patient.
Figure 6A:
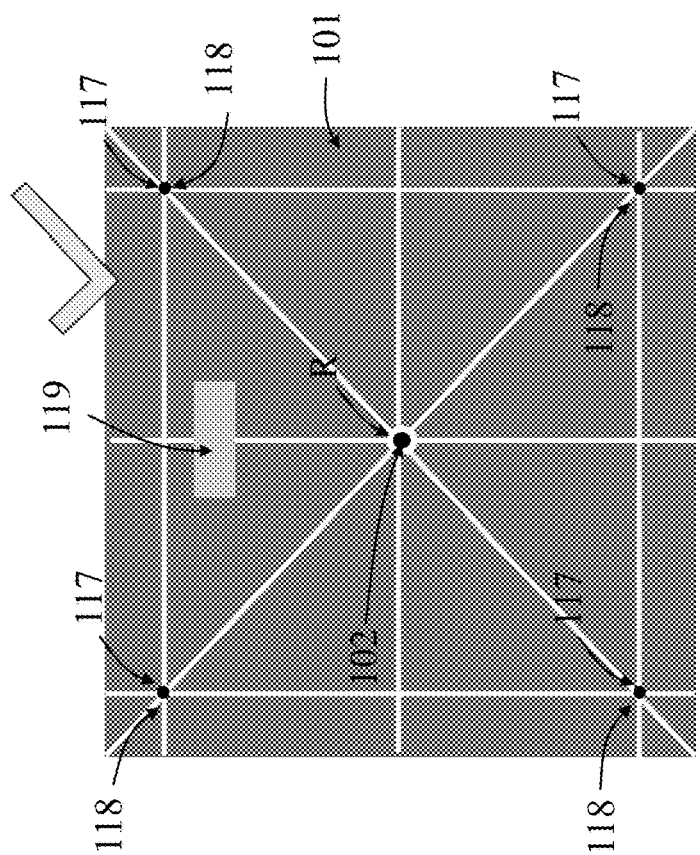

FIG. 5 is a flowchart illustrating tasks of a method 200 of quantifying the impact (e.g., the level of bothersomeness) of dysphotopsias (e.g., entopic phenomena, such as glare, halos, and/or starbursts) in a patient, such as a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or in a patient wearing contact lenses. In the illustrated embodiment, the method 200 includes a task 210 of calibrating the ring halometer system 100. In one or more embodiments, the task 210 of calibrating the ring halometer system 100 includes measuring the illuminance of the light emitted from the first light source 102 (e.g., the LED) and/or the illuminance of the light emitted from the second light source 103 (e.g., the projector) with the lux meter 108 (i.e., the light meter) and setting the illuminance of the light to a desired intensity, such as in a range from approximately 1 lux to approximately 100 lux, or more preferably from approximately 20 lux to approximately 80 lux (e.g., in a range from approximately 45 lux and approximately 78 lux). In task 210, the lux meter 108 may automatically calibrate the illuminance of the light ring R projected on the white screen 101 by the second light source 103 and/or automatically calibrate an illuminance of the glare source emitted by the first light source 102. In one or more embodiments, in task 210, the lux meter 108 may be used to check (e.g., verify) a calibration of an illuminance of the light ring R projected on the white screen 101 by the second light source 103 and/or an illuminance of the glare source emitted by the first light source 102 is correct before the test is performed. In one or more embodiment, the luminance of the light ring emitted by the second light source 103 may be in a range from approximately 0.5 $cd/m^2$ to approximately 110 $cd/m^2$ or more preferably from 1 $cd/m^2$ to approximately 25 $cd/m^2$. In one or more embodiments, the task 210 also includes aligning the light ring R projected from the second light source 103 (e.g., the projector) to be concentric or substantially concentric with the light emitted from the first light source 102. FIGS. 6A-6B depict a task of aligning the light ring R projected from the second light source 103 with the glare light source L emitted from the first light source 102 according to one embodiment of the present disclosure includes adjusting the second light source 103 until the light ring R surrounds the first light source 102 on the screen 101 and four corners 117 of a pattern projected by the second light source 103 overlap corresponding alignment markers 118 (e.g., dots) on the screen 101. FIG. 6A depicts proper alignment between the light ring R projected by the second light source 103 and the first light source 102, and FIG. 6B depicts misalignment between the light ring R projected by the second light source 103 and the first light source 102. In one or more embodiments, the task 210 may include projecting a gray bar 119 (e.g., a gray rectangle) onto the screen 101 from the second light source 103 and confirming that a bright frame 120 does not appear around the gray bar 119 (as shown in FIG. 6A) or, if the bright frame 120 does appear around the gray bar 119 (as shown in FIG. 6B), adjusting the sharpness of the second light source 103 (e.g., the projector) to be zero (or substantially zero) such that the bright frame 120 is no longer visible.

In the illustrated embodiment, the method 200 also includes a task 220 of measuring a pupil size of one of the patient's eyes. The task 220 of measuring the patient's pupil size may utilize any suitable technique and/or device, such as, for example, a pupil gauge, the Rosenbaum (or equivalent) Card, a pupillometer (e.g., the Colvard pupillometer or the Procyon pupillometer), or any other device utilized by corneal topographers and tomographers. In one or more embodiments, the method 200 may not include the task 220 of measuring the pupil size of one of the patient's eyes.

In the illustrated embodiment, the method 200 also includes a task 230 of emitting, with the first light source 102 (e.g., at least one LED), a glare source of light from the plane of screen 101 (e.g., a white screen) viewed by a patient (e.g., a patient that had cataract and refractive surgery to implant a presbyopia-correcting intraocular lens (IOL), corneal refractive surgery (e.g., LASIK or presby-LASIK), cornea reshaping (orthokeratology) to treat keratoconus, or in a patient wearing contact lenses). In one or more embodiments, the illuminance of the first light source utilized in task 230 may be in a range from approximately 1 lux to approximately 100 lux, or more preferably from approximately 20 lux to approximately 80 lux (e.g., in a range from approximately 45 lux to approximately 78 lux). As described above, the first light source 102 functions as a glare source, and when the light L emitted from the first light source 102 refracts, reflects, and/or passes through an optical surface of the patient's eye (e.g., the IOL implanted in the patient's eye), it generates a veil of light V in the patient's retina (see FIGS. 2-3).

In the illustrated embodiment, the method 200 also includes a task 240 of displaying, with the second light source 103, a light ring R on the screen. In task 240, the light ring R is concentric or substantially concentric with the light L emitted from the screen 101 by the first light source 102. Additionally, in one or more embodiments, the light L emitted from the first light source 102 and the light ring R emitted from the second light source 103 may be centered (or substantially centered) on the screen 101.

The method 200 also includes a task 250 of adjusting the diameter of the light ring R projected on the screen 101 such that the diameter of the light ring R is equal or substantially equal to the diameter of the veil of light V. If the diameter of the light ring R is initially smaller than the diameter of the veil of light V, the task 250 may include increasing the diameter of the light ring R until the light ring R becomes visible to the patient from behind the veil of light V (i.e., the task 250 may include increasing the diameter of the light ring R until the diameter of the light ring R is equal or substantially equal to the diameter of the veil of light V). If the diameter of the light ring R is initially larger than the diameter of the veil of light V, the task 250 may include decreasing the diameter of the light ring R until the light ring R disappears into the veil of light V such that the light ring R is no longer visible by the patient (i.e., the task 250 may include decreasing the diameter of the light ring R until the diameter of the light ring R is equal or substantially equal to the diameter of the veil of light V). In one or more embodiments, the task 250 may include adjusting the diameter of the light ring R until the light ring R has the smallest diameter such that the light ring R is still discernible from the veil of light V. The task 250 of adjusting the diameter of the light ring R may be performed by the patient (e.g., the patient may operate an I/O device, such as a mouse and/or keyboard, to increase or decrease the diameter of the light ring R) or may be performed by a technician (e.g., a clinician) running the test.

In the illustrated embodiment, the method 200 also includes a task 260 of receiving a signal or other indication from the patient when the diameter of the light ring R is equal or substantially equal to the diameter of the veil of light V (e.g., a signal or other indication from the patient that the light ring R has decreased from its initial diameter to be visually obstructed by the veil of light V, or that the light ring R has sufficiently increased from its initial diameter to now be visible to the patient from behind the veil of light V).

In the illustrated embodiment, after the patient indicates that the diameter of the light ring R is equal or substantially equal to the diameter of the veil of light V in task 260, the method 200 includes a task 270 of determining (e.g., measuring or calculating) the level of impact (e.g., the level of bothersomeness) of the dysphotopsias on the patient (e.g., due to the IOL) based on the diameter of the light ring R and thus the diameter of the veil of light V. In one or more embodiments, the task 270 includes determining the visual angle subtended by the light ring (according to Equation 1 above) and the correspondent scatter level (according to Equation 2), and then determining the corresponding level of bothersomeness of the dysphotopsias. In one or more embodiments, the task 270 may reference a database, such as a lookup table, associating different visual angles (or different ranges of visual angles) with different levels of bothersomeness of the dysphotopsias. In one or more embodiments, the level of bothersomeness determined in task 270 may range from 1 (low level bothersomeness) to 5 (high level bothersomeness), although in one or more embodiments any other suitable scale may be utilized. In this manner, the systems and methods of the present disclosure are configured to quantify the level of bothersomeness of dysphotopsias in a more objective and less invasive manner than conventional techniques.

In one or more embodiments, the task 250 of adjusting the light ring (e.g., increasing and/or decreasing the diameter of the light ring) until the diameter of the light ring is equal (or substantially equal) to the diameter of the veil of light, and the task 260 of receiving a signal or other indication from the patient when the diameter of the light ring R is equal or substantially equal to the diameter of the veil of light V, may be repeatedly performed. Additionally, the task 270 of determining (e.g., measuring or calculating) the level of impact (e.g., the level of bothersomeness) of the dysphotopsias may be repeated performed each time tasks 250 and 260 are performed, and then the results may be averaged.

In one or more embodiments, the method 200 described above may not be performed with the ring halometer system 100 described above. In one or more embodiments, the method 200 of quantifying dysphotopsias in a patient may be performed in the Aston Glare perimeter system or the Rostock Glare perimeter system.

The above presents a description of the best mode contemplated of carrying out the concepts disclosed herein, and of the manner and process of making and using it, in such full, clear, concise, and exact terms as to enable any person skilled in the art to which it pertains to make and use the concepts described herein. The systems, methods and devices disclosed herein are, however, susceptible to modifications and alternate constructions from that discussed above which are fully equivalent. Consequently, it is not the intention to limit the scope of this disclosure to the particular embodiments disclosed. On the contrary, the intention is to cover modifications and alternate constructions coming within the spirit and scope of the present disclosure as generally expressed by the following claims, which particularly point out and distinctly claim the subject matter of the implementations described herein.

Each and every feature described herein, and each and every combination of two or more of such features, is included within the scope of the present invention provided that the features included in such a combination are not mutually inconsistent.

Although embodiments have been described and pictured in an example form with a certain degree of particularity, it should be understood that the present disclosure has been made by way of example, and that numerous changes in the details of construction and combination and arrangement of parts and steps may be made without departing from the spirit and scope of the disclosure as set forth in the claims hereinafter.

As used herein, the term "processor" refers broadly to any suitable device, logical block, module, circuit, or combination of elements for executing instructions. In a processor, as used herein, each function is performed either by hardware configured, i.e., hard-wired, to perform that function, or by more general purpose hardware, such as a CPU, configured to execute instructions stored in a non-transitory storage medium. The processor may include any combination of hardware, firmware, and software, employed to process data or digital signals. For example, the processor 109 can include any conventional general purpose single- or multi-chip microprocessor such as a Pentium® processor, a MIPS® processor, a Power PC® processor, AMD® processor, ARM processor, or an ALPHA® processor. In addition, the processor 109 can include any conventional special purpose microprocessor such as a digital signal processor. The various illustrative logical blocks, modules, and circuits described in connection with the embodiments disclosed herein can be implemented or performed with a general purpose processor or special purpose central processors (CPUs), a digital signal processor (DSP), graphics processors (GPUs), an application specific integrated circuit (ASIC), a field programmable gate array (FPGA), or other programmable logic device, discrete gate or transistor logic, discrete hardware components, or any combination thereof designed to perform the functions described herein. Processor 109 can be implemented as a combination of computing devices, e.g., a combination of a DSP and a microprocessor, a plurality of microprocessors, one or more microprocessors in conjunction with a DSP core, or any other such configuration. A processor may be fabricated on a single printed wiring board (PWB) or distributed over several interconnected PWBs. A processor may contain other processors; for example, a processor may include two processors, an FPGA and a CPU, interconnected on a PWB Computer readable memory 110 can refer to electronic circuitry that allows information, typically computer or digital data, to be stored and retrieved. Computer readable memory 110 can refer to external devices or systems, for example, disk drives or solid state drives. Computer readable memory 110 can also refer to fast semiconductor storage (chips), for example, Random Access Memory (RAM) or various forms of Read Only Memory (ROM), which are directly connected to the communication bus 114 or the processor 109. Other types of memory include bubble memory and core memory. Computer readable memory 110 can be physical hardware configured to store information in a non-transitory medium.

Methods and processes described herein may be embodied in, and partially or fully automated via, software code modules executed by one or more general and/or special purpose computers. The word "module" can refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may comprise connected logic units, such as gates and flip-flops, and/or may comprised programmable units, such as programmable gate arrays, application specific integrated circuits, and/or processors. The modules described herein can be implemented as software modules, but also may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of computer-readable medium or other computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with users, operators, other systems, components, programs, and so forth.

As used herein, the terms "about" or "approximately", when used in reference to a lux value of illuminance, mean within plus or minus 0.5 lux of the referenced illuminance. As used herein, the terms "about" or "approximately", when used in reference to a linear dimension (e.g., length, width, thickness, distance, etc.) mean within plus or minus one percent (1%) of the value of the referenced linear dimension.

What is claimed is:

1. A ring halometer system configured to quantify dysphotopsias in a patient, the system comprising:
    a white screen;
    a first light source configured to emit a glare source from a plane of the white screen, the glare source configured to form a veil of light visible to the patient when the glare source interacts with an optical surface of the eye of the patient;
    a second light source configured to project a light ring concentric with the first light source on the white screen; and
    a controller coupled to the second light source, the controller configured to adjust a size of the light ring.

2. The system of claim 1, further comprising an electronic device coupled to the first light source and the second light source.

3. The system of claim 2, further comprising a user input device of the electronic device configured to record an indication from the patient when the size of the light ring is substantially equal to a size of the veil of light.

4. The system of claim 3, wherein a memory device of the electronic device comprises instructions which, when executed by a processor of the electronic device, cause the processor to determine a level of bothersomeness of the dysphotopsias experienced by the patient based on the size of the light ring.

5. The system of claim 1, wherein the first light source comprises a light-emitting diode (LED).

6. The system of claim 1, wherein the second light source is a projector.

7. The system of claim 1, further comprising a lux meter configured to automatically calibrate an illuminance of the light ring projected on the white screen by the second light source.

8. The system of claim 1, further comprising a lux meter configured to automatically calibrate an illuminance of the glare source emitted by the first light source.

9. The system of claim 1, further comprising a lux meter configured to check a calibration of an illuminance of the light ring projected on the white screen by the second light source.

10. The system of claim 1, further comprising a lux meter configured to check a calibration of an illuminance of the glare source emitted by the first light source.

11. The system of claim 10, further comprising a controller configured to adjust the illuminance of the glare source.

12. The system of claim 1, wherein an illuminance of the glare source emitted by the first light source is in a range from approximately 1 lux to approximately 100 lux.

13. The system of claim 1, wherein a luminance of the light ring emitted by the second light source is in a range from approximately 0.5 cd/m$^2$ to approximately 110 cd/m$^2$.

14. The system of claim 1, light ring is a white ring.

15. The system of claim 1, light ring is a color ring.

16. The system of claim 1, wherein the first light source has a spectrum filter to select a desired emitting spectrum of the glare source.

17. The system of claim 1, wherein the second light source is configured to project at least one real scene image on the screen.

18. The system of claim 17, wherein the first light source comprises a plurality of light sources configured to emit light from light source areas of the natural scene image.

19. A computer-implemented method of quantifying dysphotopsias in a patient, the method comprising:
   emitting, from a first light source, a glare source generating a veil of light in a retina of the patient;
   displaying, with a second light source, a light ring on the white screen concentric with the glare source;
   varying a diameter of the light ring displayed on the white screen;
   receiving an indication, from the patient, in response to the diameter of the light ring being substantially equal to a diameter of the veil of light.

20. The method of claim 19, wherein the varying of the diameter of the light ring comprises increasing the diameter of the light ring.

21. The method of claim 19, wherein the varying of the diameter of the light ring comprises decreasing the diameter of the light ring.

22. The method of claim 19, further comprising quantifying a level of bothersomeness of the dysphotopsias experienced by the patient based on the diameter of the light ring following the receiving of the indication from the patient.

23. The method of claim 19, further comprising:
   measuring, with a light meter, an illuminance of the glare light source from the first light source; and
   adjusting the illuminance of the glare light source.

24. The method of claim 19, further comprising:
   measuring, with a light meter, an illuminance of the light ring on the white screen; and
   adjusting the illuminance of the light ring.

25. The method of claim 19, further comprising: measuring, with a light meter, an illuminance of the glare source from the first light source; and
   checking if a calibration of the illuminance of the glare source is correct.

26. The method of claim 19, further comprising:
   measuring, with a light meter, an illuminance of the light ring on the white screen; and
   checking if a calibration of the illuminance of the light ring is correct.

27. A computer-implemented method of quantifying dysphotopsias in a patient, the method comprising:
   viewing a glare light source emitted from a white screen, the glare light source generating a veil of light in the patient's retina;
   viewing a light ring on the white screen concentric with the glare light source; and
   adjusting a size of the light ring until a diameter of the light ring is substantially equal to a diameter of the veil of light.

28. The method of claim 27, further comprising entering a selection, with a user-input device, in response to the diameter of the light ring being substantially equal to the diameter of the veil of light.

29. The method of claim 27, wherein the adjusting the size comprises increasing the diameter of the light ring until the light ring is visible from the veil of light.

30. The method of claim 27, wherein the adjusting the size comprises decreasing the diameter of the light ring until the light ring disappears into the veil of light.

\* \* \* \* \*